US011122624B2

United States Patent
Abouelseoud et al.

(10) Patent No.: US 11,122,624 B2
(45) Date of Patent: Sep. 14, 2021

(54) PRE-PACKET ARRIVAL CHANNEL CONTENTION

(71) Applicant: SONY GROUP CORPORATION, Tokyo (JP)

(72) Inventors: Mohamed Abouelseoud, San Francisco, CA (US); Kazuyuki Sakoda, Campbell, CA (US); Liangxiao Xin, San Jose, CA (US)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 16/584,246

(22) Filed: Sep. 26, 2019

(65) Prior Publication Data

US 2020/0396768 A1 Dec. 17, 2020

Related U.S. Application Data

(60) Provisional application No. 62/862,341, filed on Jun. 17, 2019.

(51) Int. Cl.
*H04W 74/04* (2009.01)
*H04W 74/08* (2009.01)
*H04W 80/02* (2009.01)
*H04W 84/12* (2009.01)

(52) U.S. Cl.
CPC ........ *H04W 74/0816* (2013.01); *H04W 80/02* (2013.01); *H04W 84/12* (2013.01)

(58) Field of Classification Search
CPC .......................... H04W 74/0816; H04W 84/12
See application file for complete search history.

(56) References Cited

U.S. PATENT DOCUMENTS

| 7,286,551 B2 * | 10/2007 | Park | H04L 29/06027 |
| | | | 370/412 |
| 8,483,140 B1 * | 7/2013 | Gazzard | H04W 4/00 |
| | | | 370/329 |

(Continued)

FOREIGN PATENT DOCUMENTS

| EP | 3393145 A1 | 10/2018 |
| WO | 2018222662 A1 | 12/2018 |

OTHER PUBLICATIONS

"Kamal Rahimi et al., An Energy Efficient MAC Protocol for Fully Connected Wireless Ad Hoc Networks, Jul. 23, 2014, IEEE, pp. 1-12".*

*Primary Examiner* — Rasheed Gidado
(74) *Attorney, Agent, or Firm* — O'Banion & Ritchey LLP; John P. O'Banion

(57) ABSTRACT

Performing a pre-packet arrival channel contention procedure in stations of a WLAN to enhance support for real-time applications (RTAs) which are sensitive to communication delays. The stations track active real-time application sessions and identify running RTA sessions with respect to communication times, rates and packet sizes. A station attempts to gain access to the communication channel using a pre-packet arrival channel contention process before a packet arrives from the application layer of an RTA, based on information received from the RTA as to what time the packet will arrive to a MAC queue in a MAC layer of the wireless station. Thus, the RTA packets incur less delay while the process can also reduce communications overhead.

12 Claims, 22 Drawing Sheets

(56) References Cited

U.S. PATENT DOCUMENTS

| | | | |
|---|---|---|---|
| 2007/0160060 A1* | 7/2007 | Dalmases | H04L 12/64 370/395.4 |
| 2009/0137254 A1* | 5/2009 | Vukovic | H04W 72/0413 455/452.1 |
| 2017/0039245 A1* | 2/2017 | Wholey, III | G06F 16/9024 |
| 2019/0029037 A1 | 1/2019 | Wang | |
| 2020/0344800 A1* | 10/2020 | Reuche | H04W 28/0268 |

* cited by examiner

FIG. 1 (Prior Art)

HE-SU | L-STF (8μs) | L-LTF (8μs) | L-SIG (4μs) | RL-SIG (4μs) | HE-SIG-A (8μs) | HE-STF (4μs) | HE-LTFs | Data | PE

FIG. 2 (Prior Art)

HE-MU | L-STF (8μs) | L-LTF (8μs) | L-SIG (4μs) | RL-SIG (4μs) | HE-SIG-A (8μs) | HE-SIG-B (16μs) | HE-STF (4μs) | HE-LTFs | Data | PE

FIG. 3 (Prior Art)

HE-TB | L-STF (8μs) | L-LTF (8μs) | L-SIG (4μs) | RL-SIG (4μs) | HE-SIG-A (8μs) | HE-STF (8μs) | HE-LTFs | Data | PE

Trigger frame

| Frame Control | Duration | RA | TA | Common Info | User Info | ... | User Info | FCS |

FIG. 4 (Prior Art)

Common Info field

| Trigger Type | Length | Cascading Indication | CS Required | BW | GI And LTF Type | MU MIMO LTF Mode | Number of HE-LTF Symbols | STBC |
| LDPC Extra Symbol Segment | AP TX Power | Packet Extension | Spatial Reuse | Doppler | GI And LTF Type | HE-SIG-A Reserved | Reserved | |

FIG. 5 (Prior Art)

User Info field

| AID12 | RU Allocation | Coding Type | MCS | DCM | SS Allocation | Target RSSI | Reserved |

FIG. 6 (Prior Art)

| BA frame | Frame Control | Duration | RA | TA | BA control | BA info | FCS |
**FIG. 7
(Prior Art)**
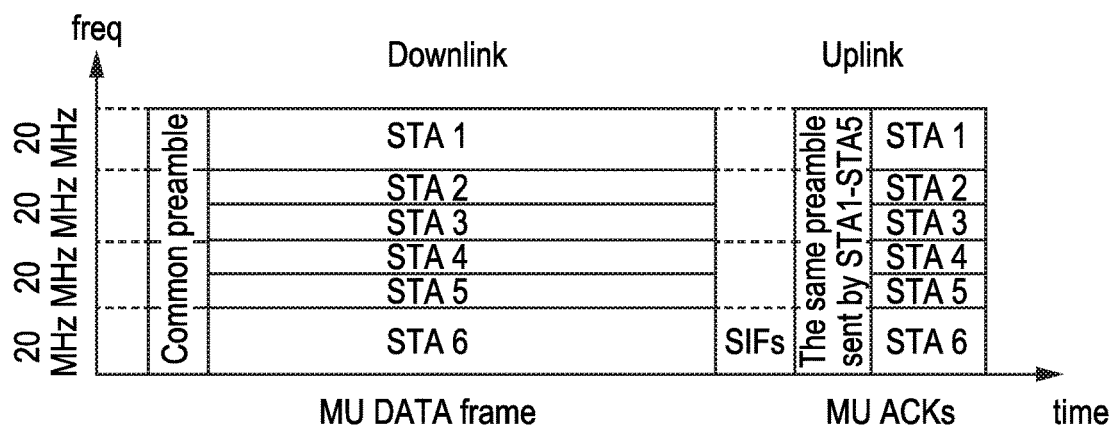
**FIG. 8
(Prior Art)**
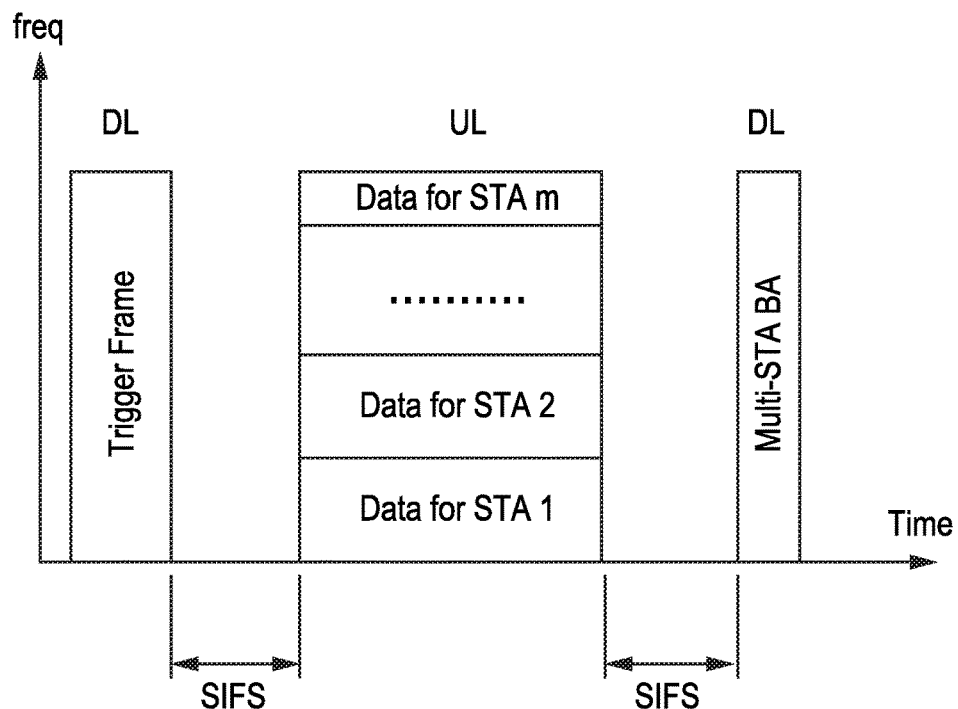
**FIG. 9
(Prior Art)**

| Data frame | Frame Control | Duration | RA | TA | Sequence Control | Data | FCS |

FIG. 11
(Prior Art)

| ACK frame | Frame Control | Duration | RA | FCS |

FIG. 12
(Prior Art)

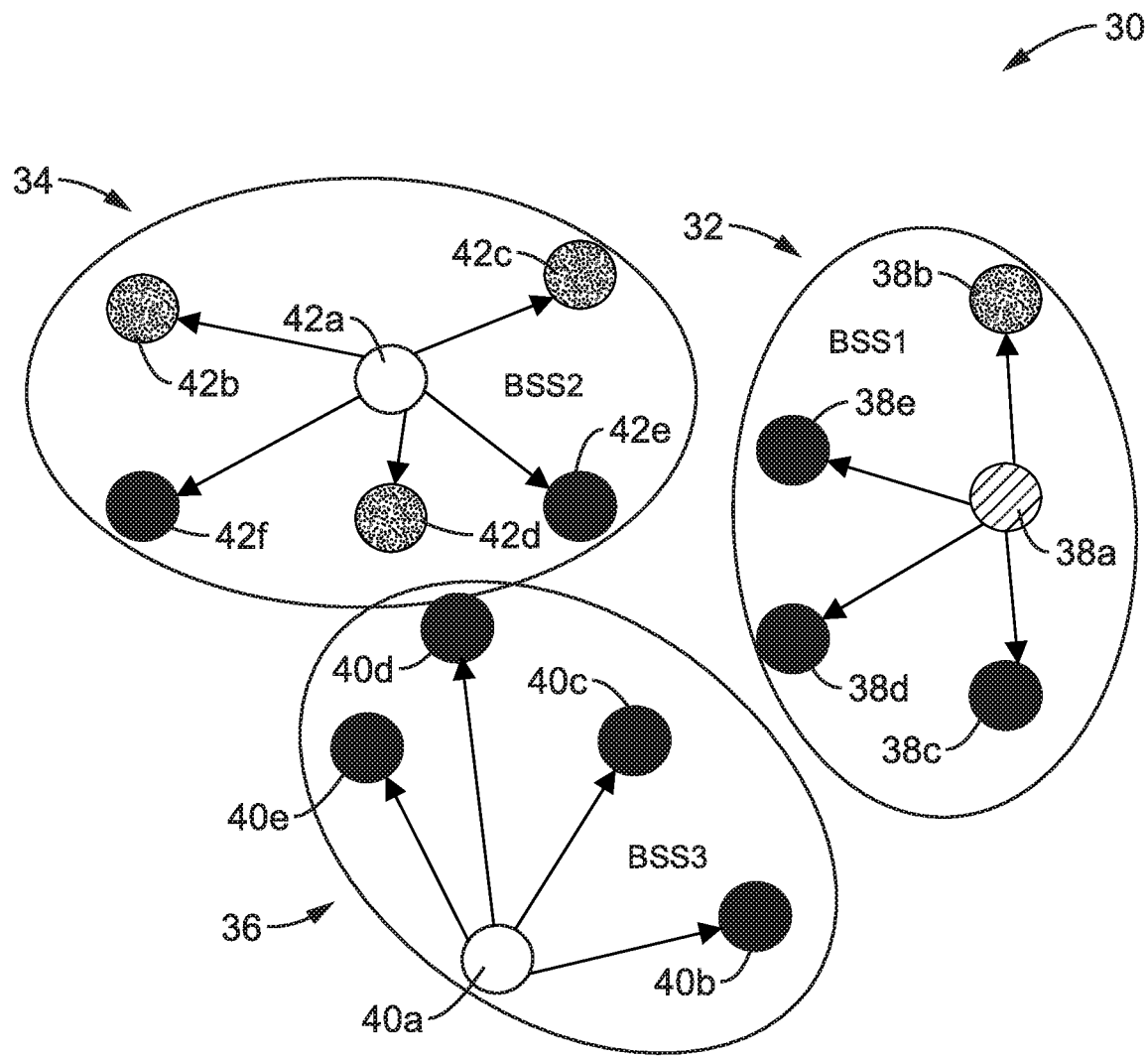
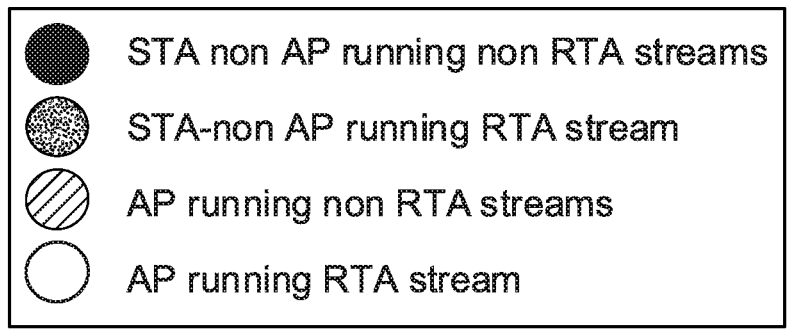
FIG. 18

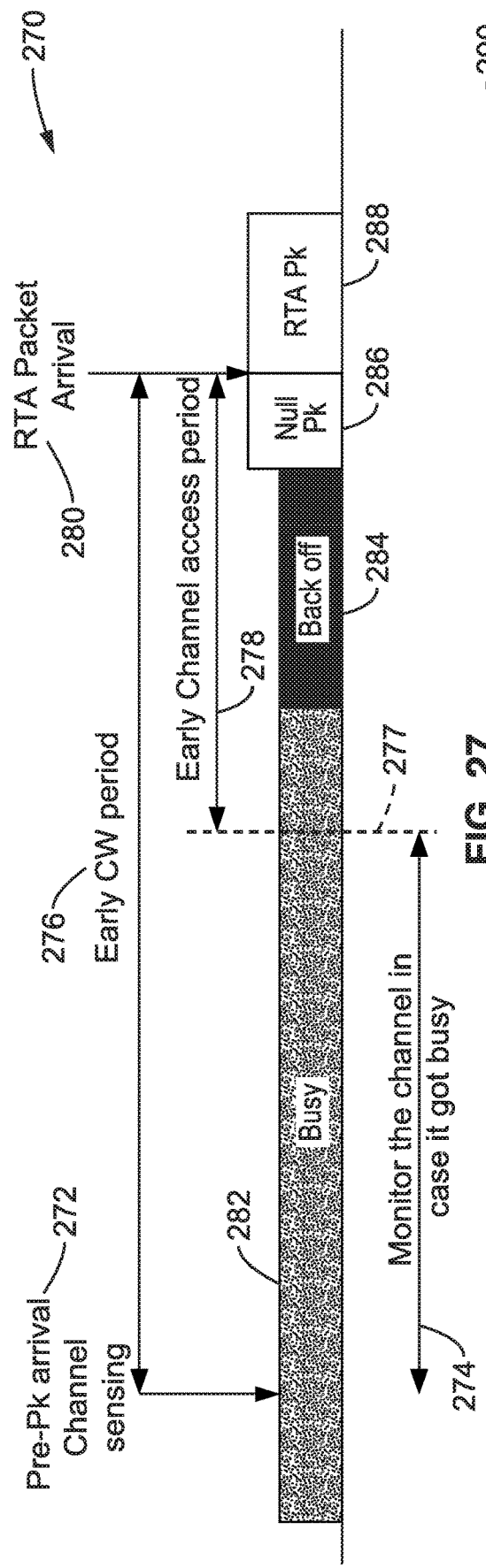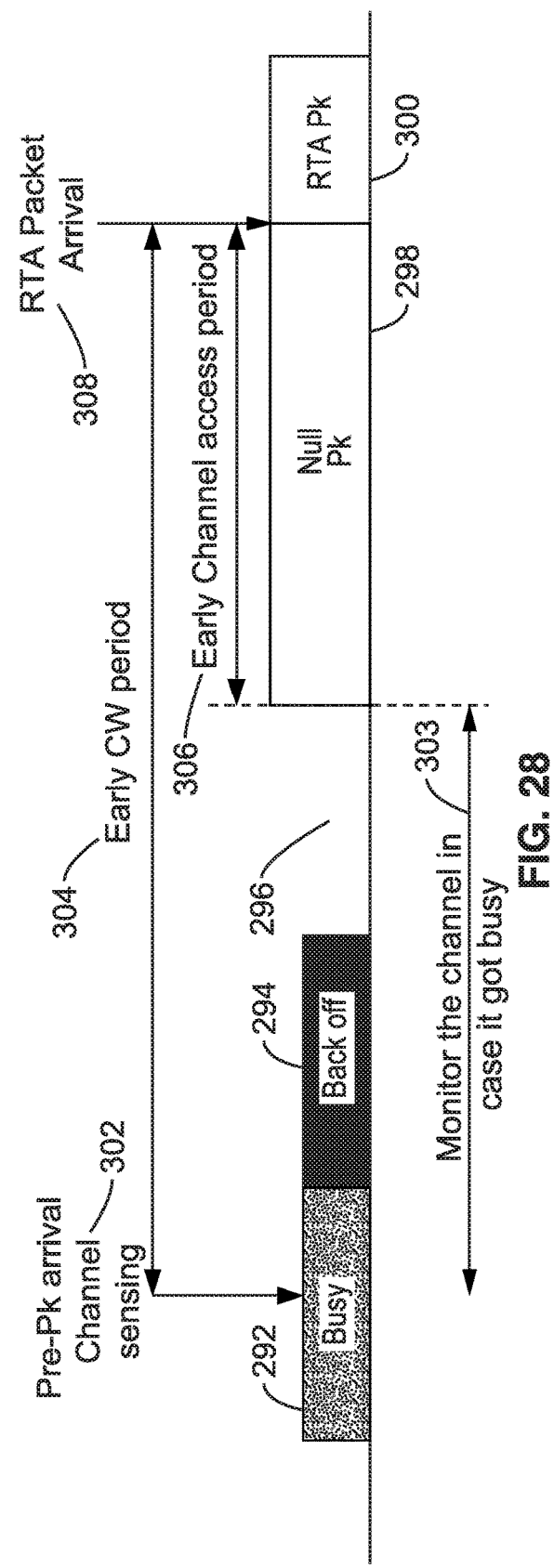

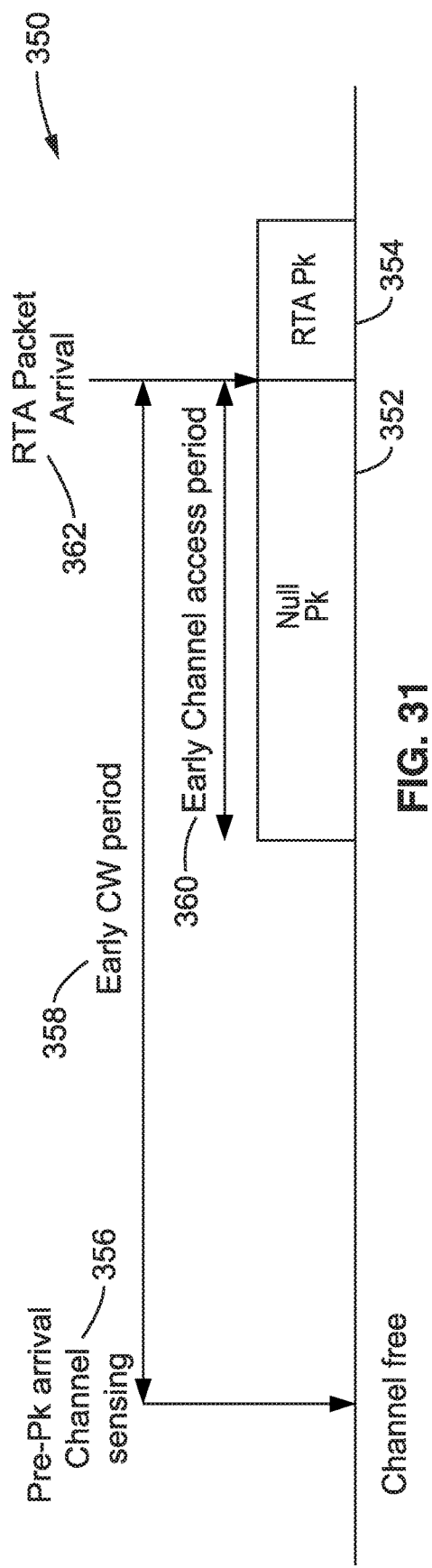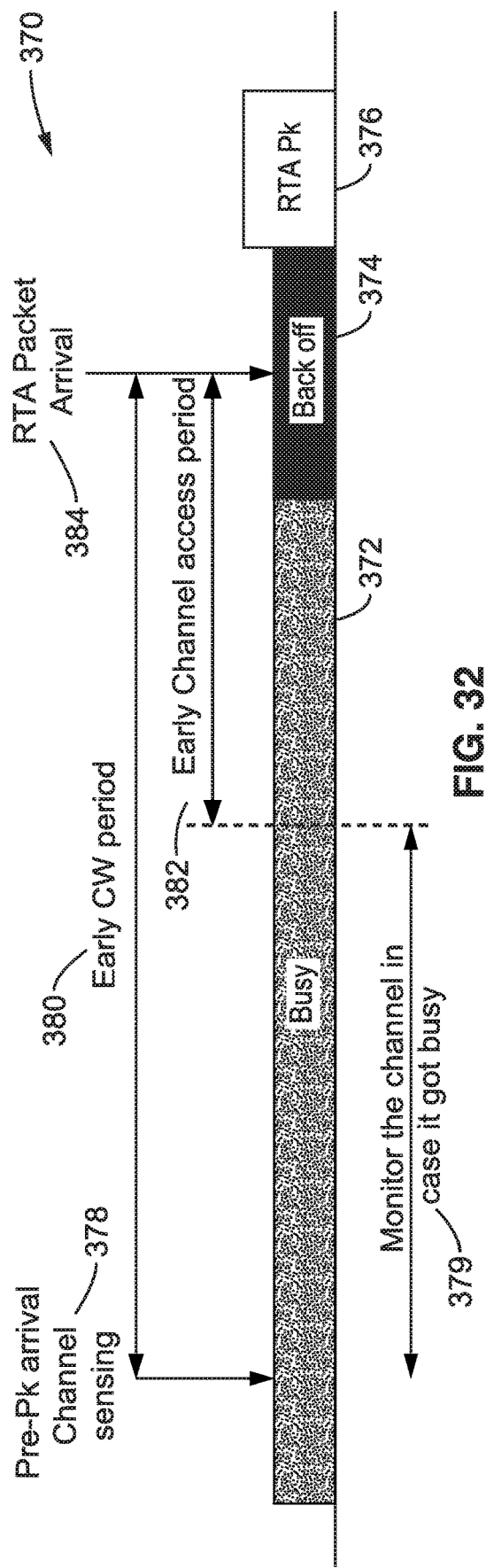

PRE-PACKET ARRIVAL CHANNEL CONTENTION

CROSS-REFERENCE TO RELATED APPLICATIONS

This application claims priority to, and the benefit of, U.S. provisional patent application Ser. No. 62/862,341 filed on Jun. 17, 2019, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless networks, and more particularly to channel contention performed for real-time applications (RTA) on the basis of information about packet size and arrival.

2. Background Discussion

Most of the devices in the market now have access to the internet through Wi-Fi networks. The WiFi networks are growing every day to allow more throughput and possibility to connect more users to each network.

However in dense environments, or situations in which interference exists, the latency and reliability is not guaranteed. Wi-Fi networks are considered generally a best effort communication. Real time gaming and delay sensitive applications are a fast developing category where delay and reliability of the data traffic is of great value. For these applications to provide a satisfactory user experience and for the system to reliably function, the end-to-end delay should not be noticeable to the end user, and parameters such as worst case latency become very important. This is because a delay spike might ruin application performance and provide unexpected results.

Current wireless technologies using CSMA/CA focus on high throughput performance of the network, yet lack adequate low latency capability. However, numerous applications, such as real time applications (RTA), require low latency due to a high timeliness requirement on packet delivery; because the RTA data is valid only when it is delivered within a certain period of time.

Due to a random channel access scenario, STAs currently need to sense and contend for channel access before transmitting each packet, which can be a source of delay. Other sources of delay include power saving mechanisms, queuing delays and transmission delays which add to end-to-end packet transmission delay.

Accordingly, a need exists for WLAN protocols which provide reduced delays and communication overheads for real time applications. The present disclosure fulfills that need and provides additional benefits over previous technologies.

BRIEF SUMMARY

Real-time application data being carried by stations of a conventional wireless network is subject to often unworkable levels of latency and high overhead levels. One of the more significant contributors to this delay, and the uncertainty in the amount of delay, is the need to contend for channel access, such as by using conventional CSMA/CA protocols that organize channel access and avoid collisions when there are multiple devices vying to access the channel at the same time.

One solution in the CSMA/CA wireless technology is to let a STA obtain channel access faster by speeding up channel contention time. Toward achieving this, there is a need to redesign the MAC and PHY of the current 802.11 to allow bounding worst case latency for real-time applications (RTAs) and improving connection reliability.

A pre-packet arrival contention procedure is described in which a running real-time application (RTA) communicates with the associated stations MAC layer on the expected time of arrival of the RTA packet. Under the present disclosure, the MAC layer having information on the expected time of arrival of the RTA packet contends for channel access before the packet arrives from the real-time application, thus reducing latency in obtaining a channel for communication of real-time data.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram of a High Efficiency (HE) Single User (SU) PLCP Protocol Data Unit (PPDU) for an IEEE 802.1 lax WLAN.

FIG. 2 is a data field diagram of a High Efficiency (HE) multi-user (MU) PLCP Protocol Data Unit (PPDU) format used for downlink multi-user transmission for an IEEE 802.11ax WLAN.

FIG. 3 is a data field diagram of a High Efficiency (HE) Trigger-based (TB) PLCP Protocol Data Unit (PPDU) used for uplink multi-user transmission in an IEEE 802.11ax WLAN.

FIG. 4 is a data field diagram of a Trigger frame for an IEEE 802.11ax WLAN.

FIG. 5 is a data field diagram of a common information field as seen in the trigger frame of FIG. 4.

FIG. 6 is a data field diagram of a user information field as seen in the trigger frame of FIG. 4.

FIG. 7 is a data field diagram of a Block ACK (BA) frame for an IEEE 802.11ax WLAN.

FIG. 8 is a frequency use diagram for Downlink (DL) OFDMA MIMO transmissions performed for an IEEE 802.11ax WLAN.

FIG. 9 is a frequency use diagram for Uplink (UL) OFDMA MIMO transmissions performed for an IEEE 802.11ax WLAN.

FIG. 11 is a data field diagram of a data frame format for a regular WLAN system.

FIG. 12 is a data field diagram of an Acknowledgement (ACK) frame format for a regular WLAN system.

FIG. 18 is a network topology diagram showing a topological example addressed according to at least one embodiment of the present disclosure.

FIG. 27 is a channel access diagram depicting handling a channel busy situation at the beginning of the early channel Contention Window (CW) period according to at least one embodiment of the present disclosure.

FIG. 28 is a channel access diagram depicting another example of handling a channel busy situation at the beginning of the early channel Contention Window (CW) period according to at least one embodiment of the present disclosure.

FIG. 31 is a channel access diagram depicting handling another situation in which the channel is not busy at the beginning of an early channel Contention Window (CW) period according to at least one embodiment of the present disclosure.

FIG. 32 is a channel access diagram depicting handling a scenario in which the channel remains busy from before the early channel CW period into the early channel access period according to at least one embodiment of the present disclosure.

DETAILED DESCRIPTION

1. Previous WLAN Implementations

Figure 10:
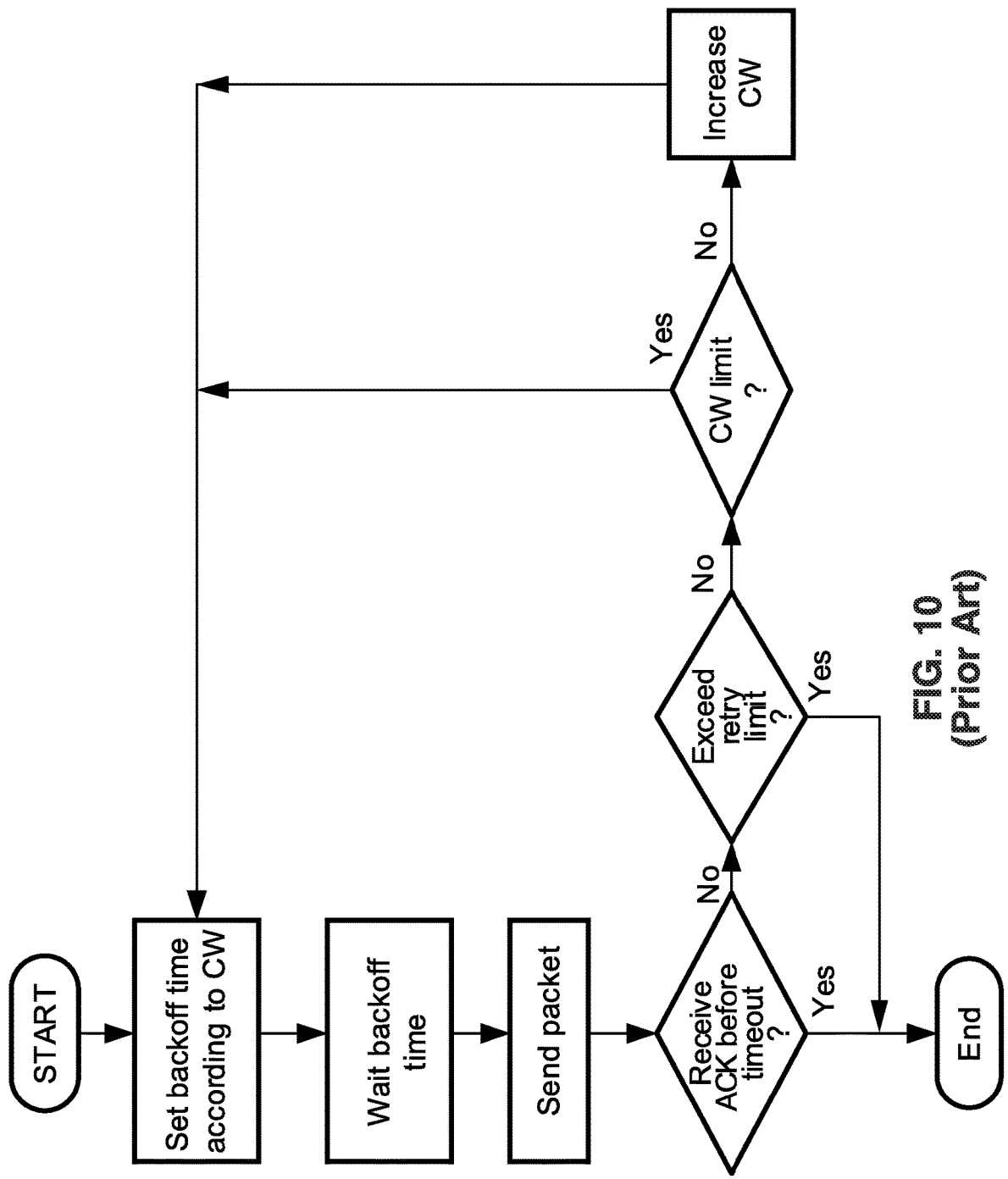
FIG. 10 is a flow diagram of using CSMA/CA to allow STAs to gain access to the channel for packet transmission and retransmission in an IEEE 802.11 WLAN.

Many 802.11 amendments have been proposed to improve the performance of the WLAN, specifically those who focus on 2.4 GHz and 5 GHz bands. Most of the previous amendments focuses on improving the maximum data rate to be received from 2 Mbits/sec originally proposed to possibly up to 9.6 GHz with the 802.11ax amendment.

Many techniques have been used to increase the data rate in the physical layer through for example increasing the channel bandwidth from 20 MHz to up to 160 MHz, using new modulations and coding schemes and the introduction of MIMO and Multi-user transmission.

Other MAC layer improvements have been introduced to reduce the overhead of transmission and hence increase the data throughput. This can be done for example by reducing the interframe spacing, aggregate and segment packets, improving the QoS handling in WiFi networks and applying power consumption protocols to alternate between the awake state and the doze state for station to save their power.

1.1. 802.11Ax PPDU Formats

IEEE 802.11ax provides a set of WLAN protocols, and specifies the set of media access control (MAC) and physical layer (PHY) protocols for implementing wireless local area network (WLAN) Wi-Fi computer communication in various frequencies. The IEEE802.11ax standards for the physical layer include the Physical Layer Convergence Protocol (PLCP) sublayer and the Physical Medium Dependent (PMD) sublayer and their interaction with the MAC layer. The MAC layer communicates with the PLCP sublayer using instructions through a service access point (SAP).

When the MAC layer instructs it to do so, the PLCP prepares MAC Protocol Data Units (MPDUs) for transmission and minimizes dependence of the MAC layer on the PMD sublayer by mapping MPDUs into a frame format suitable for transmission by the PMD. The PLCP also delivers incoming frames from the wireless medium to the MAC layer.

The PLCP appends a PHY-specific preamble and header fields to the MPDU that contain information needed by the Physical layer transmitters and receivers. The composite frame (the MPDU with an additional PLCP preamble and header) is referred to as a PLCP protocol data unit (PPDU). The MPDU is also called the PLCP Service Data Unit (PSDU), and is typically referred to as such when referencing physical layer operations. The frame structure of a PPDU provides for asynchronous transfer of PSDUs between stations. As a result, the receiving station's Physical layer must synchronize its circuitry to each individual incoming frame.

In the PMD sublayer, under direction of the PLCP, the PMD sublayer provides transmission and reception of physical layer data units between through the wireless medium by interfacing directly with the wireless medium.

IEEE 802.11ax defines multiple PPDU formats to transmit packets in different scenarios. They are listed as follows.

FIG. 1 depicts the High Efficiency (HE) Single User (SU) PPDU format used for single user transmission, which contains the following fields: L-STF as a non-HT short training field; L-LTF as a non-HT long training field; L-SIG as a non-HT SIGNAL field; RL-SIG as a repeated non-HT SIGNAL field; HE-SIG-A as an HE SIGNAL A field; HE-STF as an HE short training field; HE-LTFs as HE long training fields; Data as a data field carrying the PSDUs; and PE as a packet extension field. It should be appreciated that many of these fields are shown span a predetermined time period (exemplified in the figure in µs) instead of a specific number of bits.

FIG. 2 depicts an HE multi-user (MU) PPDU format used for downlink multi-user transmission. Compared with the single user PPDU format as shown in FIG. 1, this adds the HE-SIG-B field into its format. The HE-SIG-B field provides the channel resource allocation information to each user.

FIG. 3 depicts an HE Trigger-based (TB) PPDU format used for uplink multi-user transmission. The fields in the HE TB PPDU format are identical to those in the HE single user PPDU format, except that the HE-STF field is 8 µs.

FIG. 4 depicts the content of the trigger frame having the following fields. A Frame Control field indicates the type of the frame. A Duration field contains network allocation vector (NAV) information used for CSMA/CA channel access. An RA field contains the address for the recipient of the frame. A TA field contains the address of the STA that transmits the frame. A Common Information field includes the information for all allocated STAs, while a User Information field.

FIG. 5 depicts subfields within the Common Information field seen in FIG. 4.

FIG. 6 depicts subfields within the User Info field seen in FIG. 4.

FIG. 7 depicts the content of a block ACK frame. A Frame Control field indicates the type of the frame. A Duration field contains NAV information used for CSMA/CA channel access. An RA field contains the address of the recipient of the frame. A TA field contains the address of the STA that transmits the frame. A BA Control field indicates the policy of the block ACK. A BA info field contains the feedback of the transmission.

1.2. WLAN Features Affecting Delay 1.2.1. Channel Access and Delay Tolerance

Both contention-based and contention free access are allowed in WLAN devices. The contention based access requires the channel to sense the channel and contend every time the channel is busy in order to gain access to the channel. This introduces additional transmission delay but is necessary to provide for collision avoidance. Contention free channel access allows the AP to gain access to the channel without contention. This is allowed in the Hybrid Control Channel Access (HCCA) where channel access coordination is accomplished by using a shorter inter-frame spacing equal to PIFs (PCF inter-frame spacing) compared to the DIFS (distributed inter-frame spacing) used by other STAs. Although contention free access appears to provide a workable solution to avoid contention packet delay, it is not widely deployed and the majority of WiFi devices are performing contention based access.

Under contention based access, prior to accessing the channel a STA has to sense the channel and find that it is not busy. This channel is considered busy when: (1) the STA detects a preamble of a frame, with the channel being considered busy for the length of the detected frame; (2) the STA detects energy at more than 20 dB of the minimum sensitivity; or (3) the STA detects the channel as being virtually busy by reading the NAV of a detected frame.

802.11ax introduced two NAVs to avoid collision that might arise in falsely relying on the NAV timer. One NAV is for the BSS STAs and the other NAV for the non-BSS STAs, which are maintained separately by the STA.

802.11ax uses CSMA/CA for channel access with all legacy 802.11 WLAN devices. For an AP to send a trigger frame for Uplink (UL) Multiple-Input-Multiple-Output (MIMO) transmission it still needs to contend for channel access. In order to enable the AP to obtain (win) channel access over any STA in its BSS, the 802.11ax standard introduced a second set of Enhanced Distributed Channel Access (EDCA) for 802.11ax devices only. This standard allows legacy, non 802.11ax, devices to access the channel freely with EDCA and increase the chance of the AP to gain access of the channel in order to schedule Uplink (UL) or Downlink (DL) Orthogonal Frequency-Division Multiple Access (OFDMA) MIMO data transmission.

1.2.2. Power Saving and Delay Tolerance

Power saving modes can impact latency as well since stations are shutting down their radio to save power. The AP should buffer data for each STA in its BSS and waits for the STA to wake up to receive it. In some cases the AP needs to content for the channel when the STA is known to be awake and send the STA its packets. The STA might also wake up, contend for the channel and contact the AP to check if there are packets for itself. Another option might allow the AP and the STA to schedule times for the AP and the STA to exchange data. All these options increase transmission packet delays and introduce a trade-off between power saving and delay tolerance.

1.2.3. Multi-User Transmission and Reception 802.11 WLAN devices allow the use of MIMO antenna for transmission and reception as well as OFDMA channel access. IEEE 802.11ax supports the multi-user transmission in both uplink (UL) and downlink (DL). This allows multi-stream transmission to one or more users through up to 8 streams for example in SU-MIMO DL in 802.11ac or through multi-user transmission to more than one user through MU-MIMO DL transmission as defined in 802.11ac. This allows the AP to assign one or more streams to STAs in its Basic Service Set (BSS).

With the use of wide bandwidth channels for data transmission, up to 160 MHz, the channel is expected to be interference frequency selective as some frequencies experience different interference levels than others. This affects the expected achievable packet communication rate and degrades channel performance. To solve this problem, 802.11ax introduced OFDMA where adjacent subcarriers are grouped into resource units (RUs). These RUs can be assigned to different receivers to maximize transmission rate. This scheduling can result in maximizing the Signal of Interest Noise Ratio (SINR) for each receiver and hence allows higher Modulation and coding scheme (MCS) and therefore increases the achieved throughput. It will be noted that SINR is defined as the power of a certain signal of interest divided by the sum of the interference power from all other interfering signals and background noise.

OFDMA allows many users simultaneous use of the same resources by splitting the frequency domain among them. This results in more efficient use of the resources and can reduce latency since more users can be scheduled at the same time. Also by allowing STAs with small amounts of data to occupy narrow RUs provides increased scheduling efficiency and improved distribution of resources among low-data rate applications that require access to the channel, thus helping to reduce channel access time and overhead of frame headers and preambles.

OFDMA can be more efficient when it combines with MIMO transmission. An RU can be used to send multiple spatial streams to a STA depending on the MIMO capacities of the STAs. Also, one RU can be assigned to more than one STA to share where each can have one or more spatial streams depending on the MIMO capacities of the STAs. Packing more STAs in the same resource helps in reducing latency for the STAs and APs.

FIG. 8 depicts an example of DL OFDMA MIMO transmission. The AP is sending a PHY preamble to all STAs to specify the frequency/RUs mapping and RUs assignment for STAs.

FIG. 9 shows an example of UL OFDMA MIMO transmission. The AP is sending a trigger frame to all STAs which contain the frequency, RU mapping and RU assignments for the STAs. The UL MIMO transmission should be synchronized to the reception of that frame where STAs starts transmission after a Short Interframe Space (SIF) after the reception of the Download (DL) trigger frame.

1.2.4. Retransmission

FIG. 10 depicts using CSMA/CA to allow STAs to gain access to the channel for packet transmission and retransmission in IEEE 802.11 WLAN systems.

In CSMA/CA systems, before each transmission and retransmission, the STA has to sense the channel and set a back-off time to contend for channel access. The back-off time is decided by a uniform random variable between 0 and the size of the contention window. After the STA waits for the back-off time and senses that the channel is idle, then the STA sends a packet. The retransmission is required if the STA does not receive an ACK before timeout; otherwise the transmission succeeds.

When the retransmission is required, the STA checks the number of retransmissions of the packet. If the number of retransmissions exceeds the retry limit, then the packet is dropped and no retransmission is scheduled; otherwise the retransmission is scheduled. If the retransmission is scheduled, then another back-off time is needed to again contend for channel access for this retransmission. If the size of the contention window does not reach the upper limit, the STA increases it. The STA sets another back-off time depending on the new size of the contention window, and the STA waits the back-off time for retransmission and so forth.

FIG. 11 depicts a data frame format in regular WLAN system. A Frame Control field indicates the type of the frame. A Duration field contains NAV information used for CSMA/CA channel access. An RA field contains the address of the recipient of the frame. A TA field contains the address of the STA that transmits the frame. A Sequence control field contains the fragment number and the sequence number of packet.

FIG. 12 depicts an ACK frame format in regular WLAN system. A Frame Control field indicates the type of the frame. A Duration field contains NAV information used for CSMA/CA channel access. An RA field contains the address of the recipient of the frame.

Figure 13:
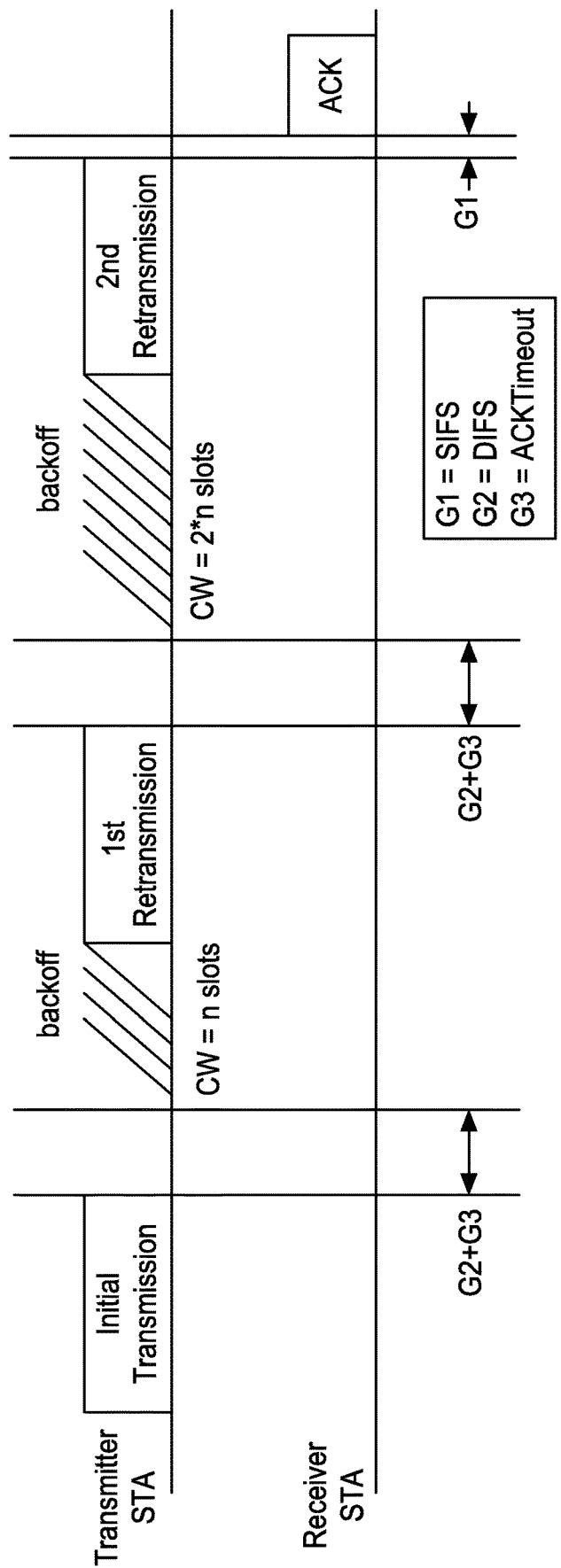
FIG. 13 is a communication period diagram for retransmission under CSMA/CA where the back-off time is increased due to retransmissions in a regular WLAN system.

FIG. 13 depicts an example of retransmission in CSMA/CA where the back-off time is increased due to retransmission. In the figure G1 represents short interframe spaces (SIFS), G2 represents DCF interframe spaces (DIFS) and G3 represents ACK Timeout. The data packet frame and the ACK frame use the formats shown in FIGS. 11 and 12, respectively. After the transmitter transmits the initial transmission of a packet, it does not receive the ACK before timeout. Then, it sets another back-off time, whereby the size of contention window is 'n' slots. After waiting for the back-off time, the transmitter STA retransmits the packet for the first time. However, the retransmission also fails. The transmitter STA needs to retransmit the packet and sets back-off time again to again contend the channel access. This time, the size of the contention window is doubled, which is 2*n slots, due to the retransmission. The expected back-off time is also doubled by the contention window size. The 2nd retransmission succeeds since it receives an ACK before timeout.

Figure 14:
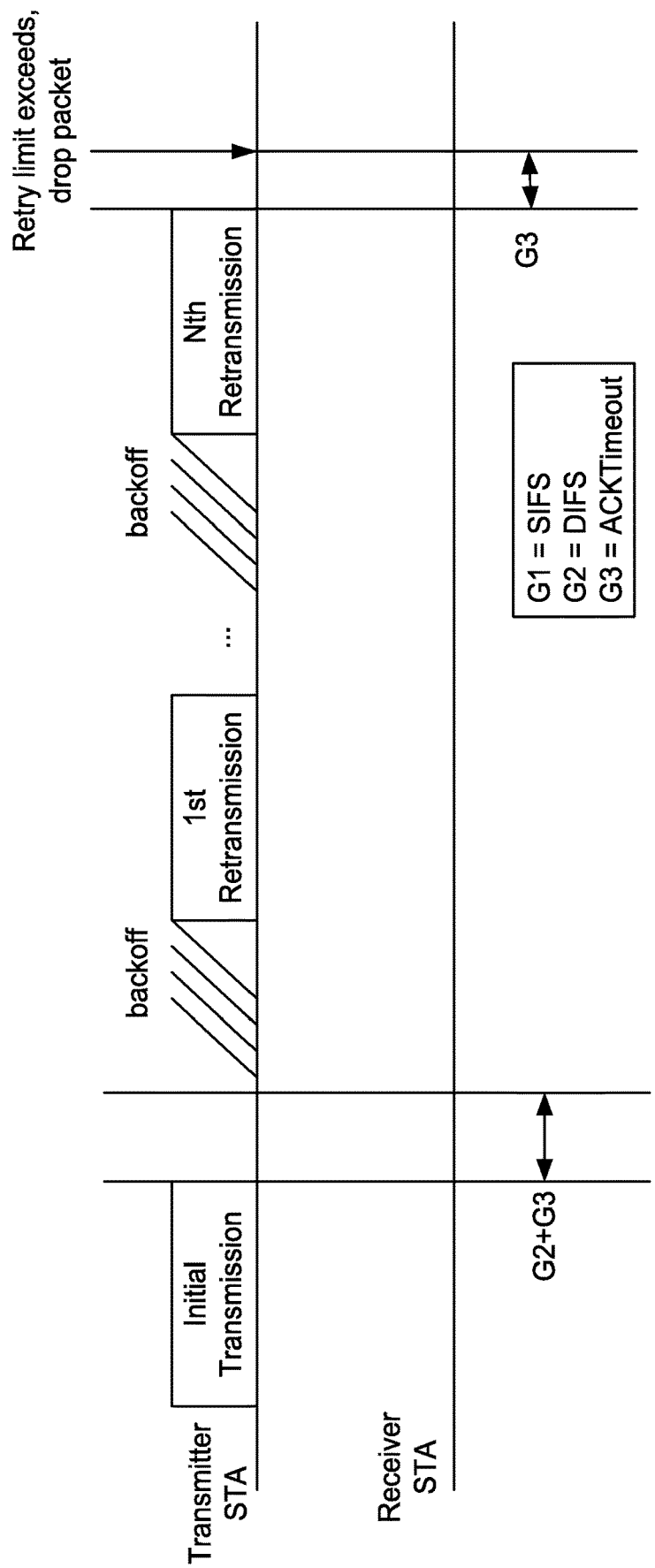
FIG. 14 is a communication period diagram of a packet being dropped after the number of retransmission exceeds the retry limit in a regular WLAN system.

FIG. 14 depicts an example of a packet being dropped after the number of retransmission exceeds the retry limit. In the figure G1 represents short interframe spaces (SIFS), G2 represents DCF interframe spaces (DIFS) and G3 represents ACK Timeout. The data packet frame and the ACK frame uses the formats previously described. As shown in the figure, after the initial transmission of a packet fails, the transmitter STA retransmits that packet multiple times; however, none of the retransmissions succeed. After retransmitting 'n' times, the number of retransmission exceeds the retry limit and the transmitter STA stops retransmitting that packet and that packet is dropped.

Figure 15:
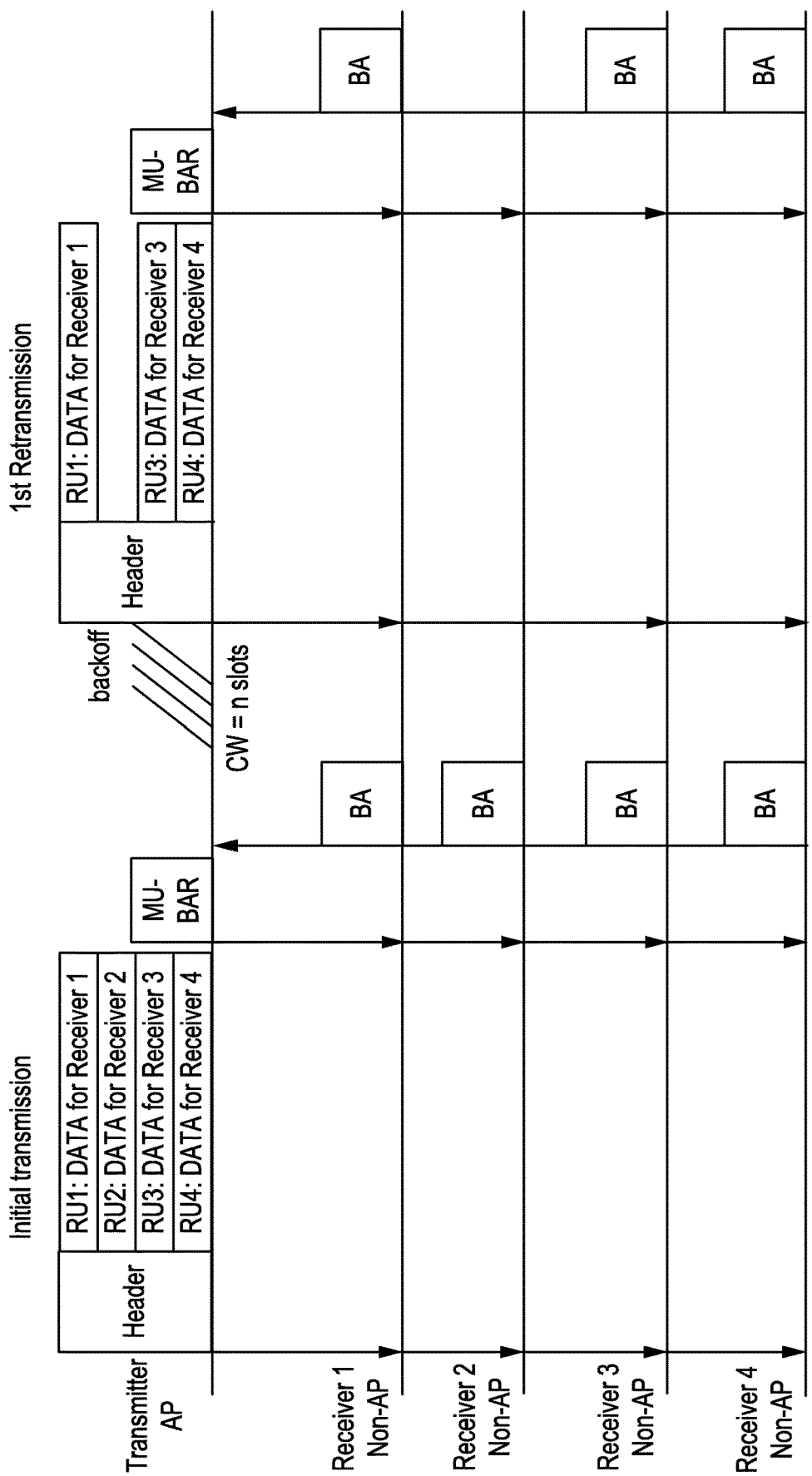
FIG. 15 is a communication period diagram of Downlink (DL) Multi-User (MU) transmission using OFDMA in a regular WLAN system.

FIG. 15 depicts an example of downlink (DL) multi-user (MU) transmission using OFDMA. The transmitter AP transmits data packets to its receivers 1, 2, 3, and 4. The data packet could use the High Efficiency (HE) MU PLCP protocol data unit (PPDU) format. After finishing the initial transmission, the AP sends a multi-user Block ACK request (MU-BAR) to all the receivers. The receivers then send Block ACK (BA) back to the AP. According to the content in the BAs, the AP decides to retransmit the packets to receiver 1, 3, and 4. The AP contends for the channel and waits the back-off time, with a first retransmission occurring after the AP gains channel access.

Figure 16:
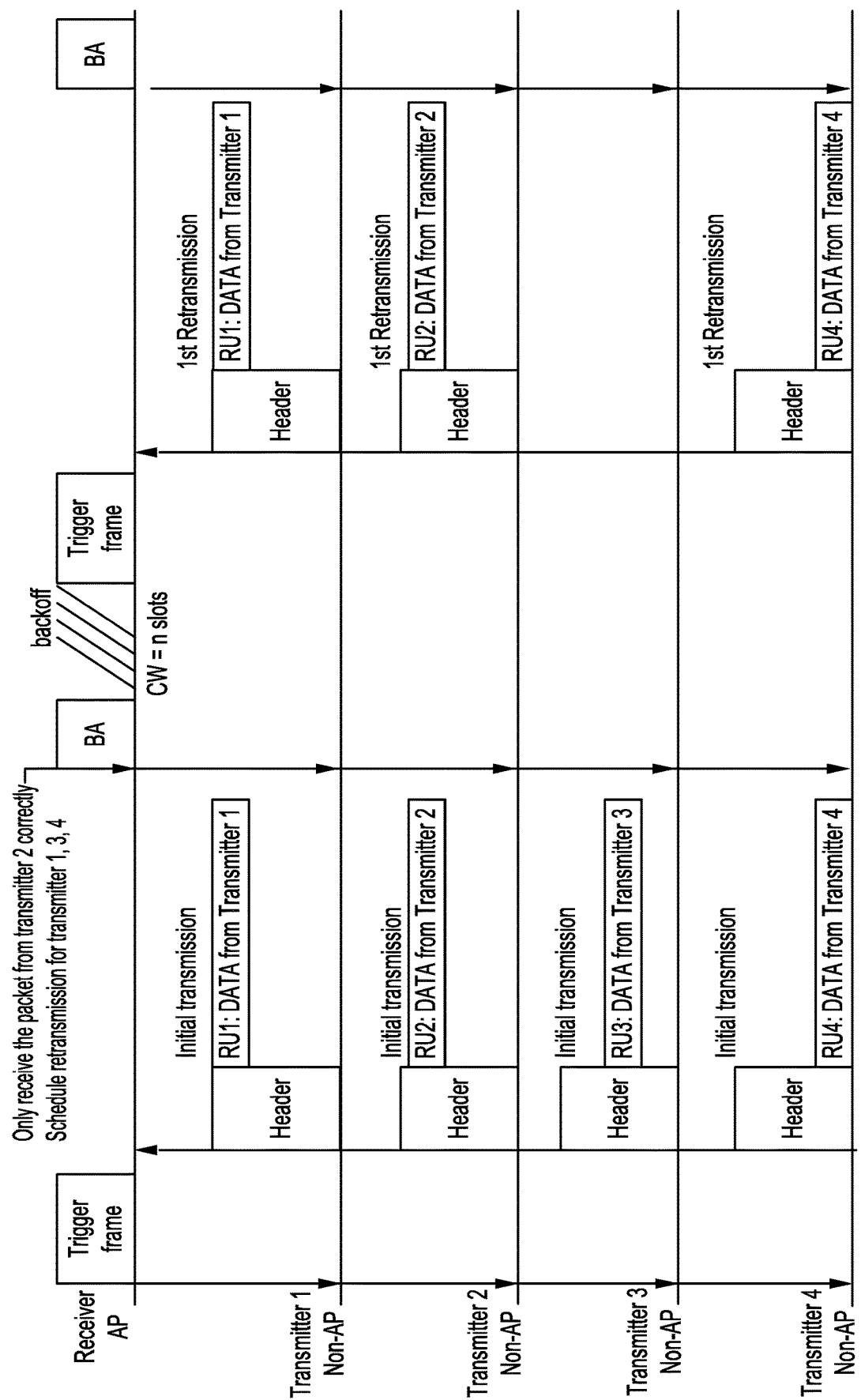
FIG. 16 is a communication period diagram of Uplink (UL) Multi-User (MU) transmission using OFDMA in a regular WLAN system.

FIG. 16 depicts an example of uplink (UL) multi-user (MU) transmission using OFDMA. The AP first sends a trigger frame to all the transmitters 1, 2, 3, and 4. The transmitters receive the trigger frame and start the initial transmission using the channel resource allocated by the trigger frame. The data packets could use the HE TB PPDU format. The AP receives the data packets from the transmitters and sends a BA frame to report the correctness of the transmission. Here, only the packet from transmitter 2 is received correctly. The retransmission needs to be scheduled for transmitters 1, 3, and 4. The AP contends for the channel and waits the back-off time to gain channel access, and upon channel access the retransmission proceeds the same as the initial transmission.

1.2.5. UL OFDMA Random Access 802.11ax introduced the UL OFDMA random access for UL transmission when the AP does not know which STA has data to transmit or when an unassociated STA wants to transmit data. The trigger frame can allocate some RUs for random UL channel access. When the AP assigns specific RUs for uplink random access the STAs use OFDMA back-off procedure to decide whether they will access the random access channel or not. This is done by selecting a back-off random value and comparing it to the number of RUs assigned for random access. If the current back-off random value is less than the number of RUs, the STA randomly accesses one of the RUs assigned for random access. Random access is expected to be efficient for short packet transmission.

1.2.6. PHY Parameters Affecting Delay
1.2.6.1. Bandwidth 802.11 allows for channelization or various bandwidths. The channel assigned for one STA transmission or reception can be 20 MHz, 40 MHz, 80 MHz or 160 MHz. Increasing the bandwidth should generally help increase data throughput and logically free the channel for other user transmissions as users complete their transmission more rapidly. Users thus can more easily obtain channel access. However, other effects can arise to create more delay as bandwidth is increased since the received signals will be more noisy. Also this increased bandwidth increases the possibility of interference with any user that is using part of the locked channel. The channel in this case can be interference frequency selective, which can result in error in reception and retransmission. Retransmission of a WLAN packets is a source of significant delay as previously discussed.

1.2.6.2. Modulation 802.11ac allows constellations of up to 256 QAM and 802.11ax allows up to 1024-QAM. Although this can increase the data throughput to up to multiple gigabits, the signal can be very sensitive to noise and interference. If the signal to interference ratio (SIR) and signal to noise ratio (SNR) is not sufficiently high, decoding errors can arise which require retransmissions, which introduce a source of delay that worsens the overall delay of the signal.

In addition, to increase the number of tones, 802.11ax increases the OFDM symbol length to 12.8 µs and allows multiple Guard Intervals (GIs) to select among them (0.8 µs, 1.6 µs, 3.2 µs) depending on channel conditions and results in decreasing overhead and increasing the efficiency of the transmission.

802.11ax allows the duplication of data on the subcarrier through the use of the optional Dual Carrier Modulation (DCM) feature which reduces throughput by half due to the double use of resource, yet it increases the reliability of the transmission thus decreasing Packet Error Rate (PER).

1.2.6.3. Frame Length

New features added to 802.11 require additional information to be pushed to the preamble and the frame header, which in return results in increasing the overhead and reducing the efficiency of resource utilization. In order to reduce the overhead at such high rates, the maximum length of the frame was increased in 802.11ac to 4,692,480 bytes. For short packets the long frame is not suitable because the overhead would be very high. It will be appreciated that "overhead" is generally considered to be the ratio between "container" bits (headers and other non-data) to the number of bits carried in the data itself.

2. Problem Statement

A WLAN STA running applications (e.g., real time applications) that are delay sensitive usually suffer significantly, and often are subject to unworkable levels of latency as well as overhead issues when communicated over traditional WLAN services. The current wireless protocols defined in the 802.11 standards are designed to provide a best effort type of service. Although the average delay for packet transmission among WLAN devices is usually good, the worst case delay is often not acceptable for applications that are delay sensitive, such as real-time applications in which data must be communicated in a timely manner.

One of the main sources of delay in packet transmission is due to the delay associated with channel access. WLAN devices need to sense the channel before accessing the channel. If the channel is found busy, the WLAN device needs to contend for channel access. This is performed by using the CSMA/CA protocol that organizes the channel access and avoids collision when there are multiple devices trying to access the channel at the same time. However the operation of delay sensitive applications can suffer significantly from the delay associated with having to utilize channel contention.

3. Contribution of the Present Disclosure

In this disclosure a delay arrival contention procedure is described. The STA running an application informs the WLAN device MAC layer of the expected time of arrival of the Real-Time Application (RTA) packet. The MAC layer knowing the expected time of arrival of the RTA packet decides to contend for channel access before packet arrival. This helps in reducing the delay of transmitting the packet once it is received from the application and gets the communication path ready for transmission since the channel has been already reserved for packet transmission.

4. STA Hardware Configuration

Each station (STA), whether utilized as a regular station (STA) or as an Access Point (AP) station has external I/O to access to applications, CPU and RAM, to run a program that implements communication protocols. The host machine accommodates Modems which transmit/receive data frames with neighboring STAs. The modem is connected to one or more RF modules to generate and receive physical signals. Each RF module includes a frequency converter, array antenna controller, and so forth. Each RF module is connected to multiple antennas which are controlled to perform beamforming for transmission and reception. In this way, the STA can transmit signals using multiple sets of beam patterns.

Figure 17:
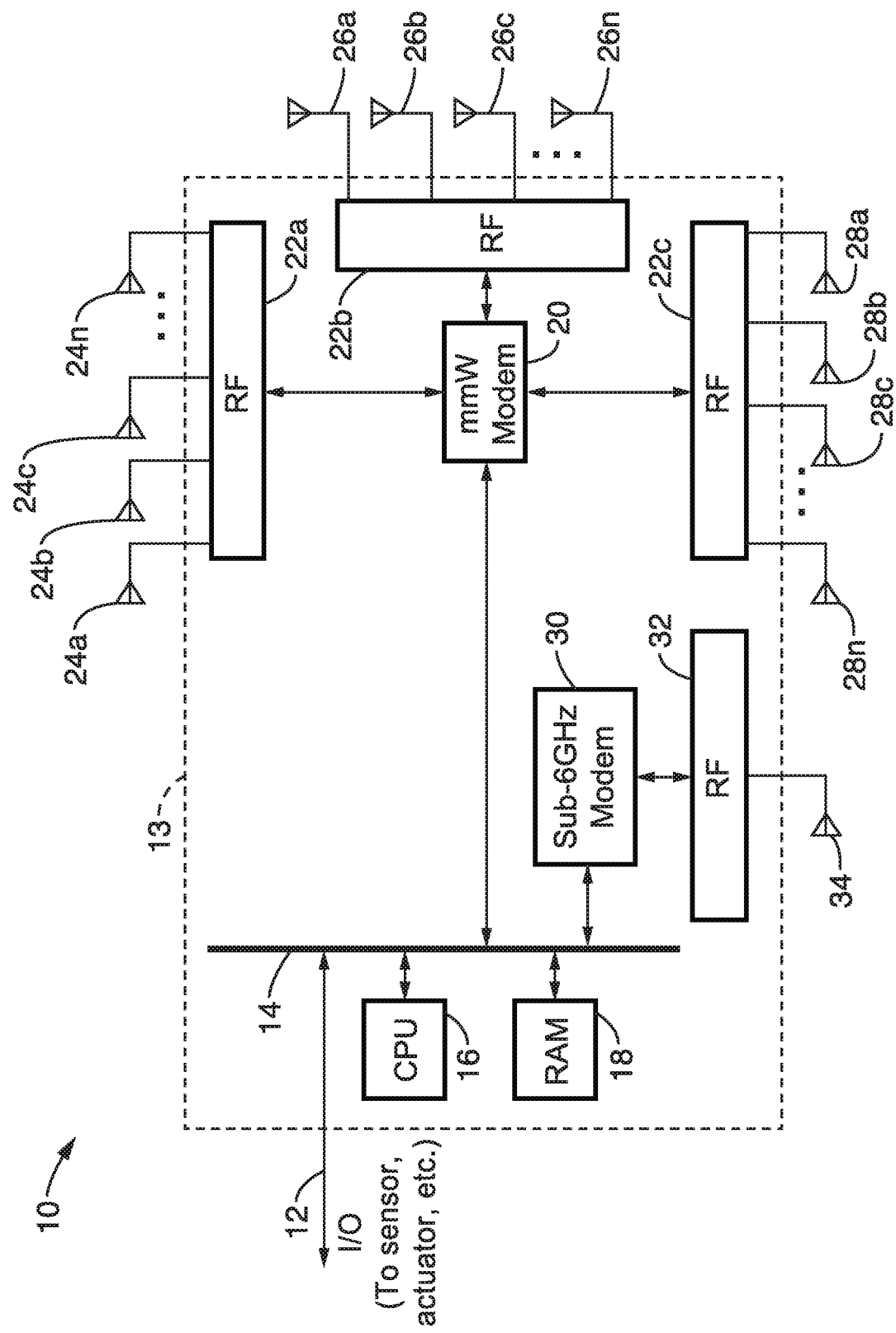
FIG. 17 is a block diagram of station (STA) hardware according to at least one embodiment of the present disclosure.

FIG. 17 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, and destination), depending on what role it is playing in the current communication context.

The STA may be configured with a single modem and single radio-frequency (RF) circuitry, or it may be configured with multiple modems and multiple RF circuits as depicted by way of example and not limitation in FIG. 17.

In this example, the host machine is shown configured with a mmW modem 20 coupled to radio-frequency (RF) circuitry 22*a*, 22*b*, 22*c* to a plurality of antennas 24*a*-24*n*, 26*a*-26*n*, 28*a*-28*n* to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to as a discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

5. Topology Under Study

FIG. 18 illustrates an example topology 30 for the sake of the following discussion. The topology depicts multiple BSSs 32, 34, 36. BSS1 32 is considered to have an Access Point (AP) 38*a* running non-RTA streams, and an STA 38*b* running RTA streams, and three STAs 38*c*, 38*d* and 38*e* running non-RTA streams. For the sake of simplicity of illustration, it will be noted that aside from the AP itself, none of the other STAs are considered to be APs. Similarly in BSS2 34 there is an AP 42*a* running RTA streams, three STAs 42*b*, 42*c* and 42*d* running RTA streams, and STAs 42*e* and 42*f* running non-RTA streams. In BSS3 36 there is seen an AP 40*a* running RTA streams and STAs 40*b*, 40*c*, 40*d*, and 40*e* running non-RTA streams. The BSSs are sharing the same channel where some of the devices are running RTAs and need to guarantee quick channel access to transmit their data.

Figure 19:
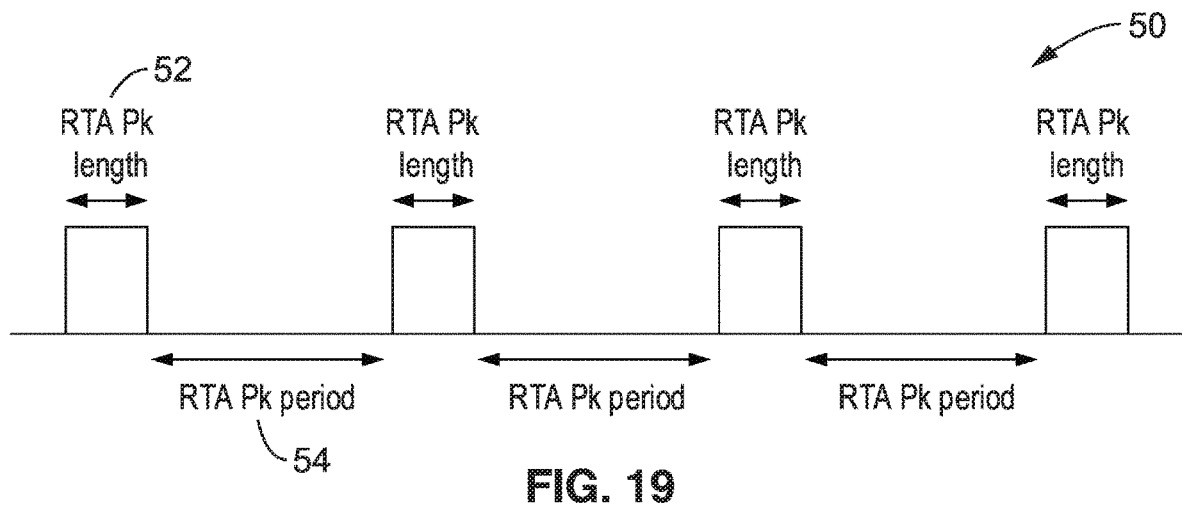
FIG. 19 is a communication sequence diagram of a station running a real-time application (RTA) according to at least one embodiment of the present disclosure.

FIG. 19 illustrates an example 50 of STAs running real-time applications (RTAs) which are generating a limited amount of data 52 (one or more packets of limited length) every period of time 54. As seen in the figure, RTA packets are arriving to the MAC layer of the STA running RTA at an expected time and are preferably to be transmitted in real time so that the real-time application continues to be responsive in real-time. Once an RTA packet is received, the next time for an RTA packet to arrive is known before hand. Each BSS contains one AP and multiple STAs, each of which can run an RTA session. Each RTA session is expected to have a packet generated with limited length with specific periodicity.

As was shown in FIG. 18, stations from multiple BSSs could compete to gain channel access for the RTA sessions and other non-RTA sessions. Each BSS is exemplified with some STAs that run RTAs, and since an RTA has a lower tolerance to delay it should more readily have access to the channel once the packet is ready for transmission. An AP can favor its RTA packets and provide them increased (higher) priority than other STAs in its BSS which request the channel by rejecting the RTS from other STAs in its BSS. An AP still needs to be able to compete with other STAs from other BSSs in the surrounding area.

6. Channel Access Delay

The packet can experience numerous types of delays after it is generated at the application layer of the transmitter, until the time it is delivered to the application layer at the receiver. One of these delays is the channel access delay, which represents the delay associated with gaining channel access when the channel is free and not in use. The following attempts to identify the source of this delay.

Any STA using a WLAN is required to listen before it talks, while STAs using CSMA/CA sense the channel before accessing it and avoid collision. Any station before accessing the channel should sense the channel, if the channel is free, the STA can access the channel. If the channel is occupied, the STA should wait until the channel is unoccupied toward minimizing the probability of collision with other STAs trying to access the channel. The channel is considered free or busy through detecting energy on the channel or by receiving a packet header. Due to sharing the medium with many STAs where some are trying to access the channel at the same time, collision avoidance mechanisms are used to prevent two channels from accessing the channel at the same time resulting in the collision of both transmitted packet streams.

Figure 20:
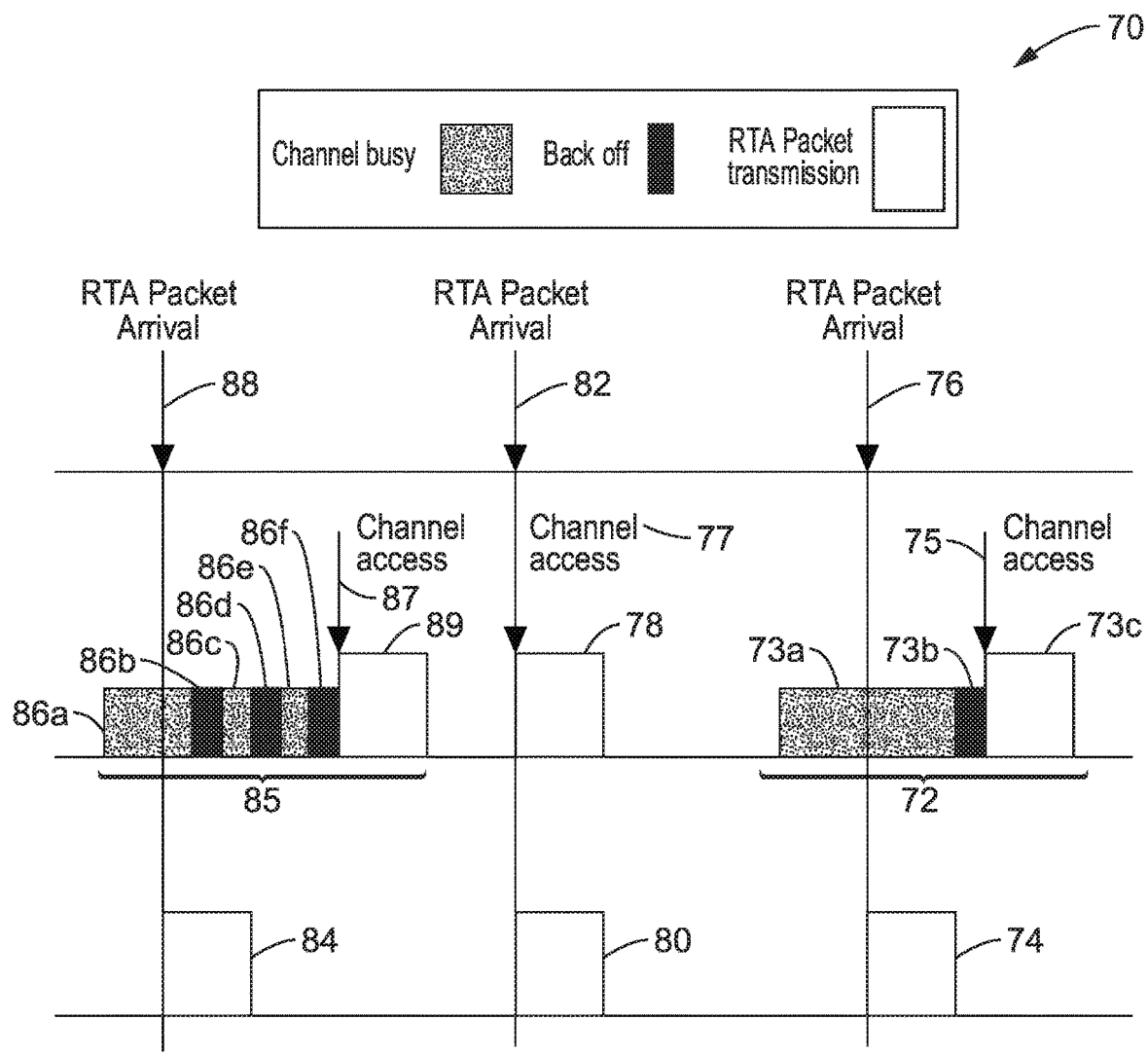
FIG. 20 is a communication sequence diagram showing different channel access scenarios addressed according to at least one embodiment of the present disclosure.

FIG. 20 illustrates some example channel access scenarios 70. In a first instance, a packet 74 arrives 76 during the busy portion 73*a* of channel activity 72. The STA contends for the channel and performs a random back-off (random back-off timer) 73*b*, and then accesses 75 the channel to send packet 73*c* if the channel is not busy.

Moving to the scenario in the middle of the figure, if an RTA packet 80 arrives 82 when the channel is not busy (free), then the STA gains immediate access 77 of the channel and starts transmitting the RTA packet 78 right away.

Moving to the scenario on the left side of the figure, it should be appreciated that after RTA packet arrival the STA may be unable to access the channel even when the channel is free again. For instance upon packet 84 arrival 88 that the channel activity 85 is seen showing a busy channel 86*a* upon packet arrival, so the STA waits until the channel is unoccupied and sets its back-off timer 86*b*, however, during this time some other channel might gain access to the channel before its back-off timer expires. Thus, after the back-off interval the channel is found to be still busy 86*c*, which can occur multiple times, with additional back-off intervals 86*d*, and busy periods 86*e*, before a back-off interval 86*f* after which the channel access 87 is gained for packet 89 transmission. The time interval from the RTA packet arrival to the channel access time represents channel access delay and is considered one of the largest sources of delay for WLAN packet transmission.

7. Pre-packet Arrival Channel Contention 7.1. RTA Stream Setup

The MAC layer should be aware of the packets of the RTA that need to be treated differently. The MAC layer is expected to run special processes (e.g., algorithms) to access the channel and give priority to transmit the RTA packets at the exact time they are supposed to be transmitted. The Application layer upon starting a real time application should inform the MAC layer of the initiation of the RTA session. The application layer upon starting a real time application should inform the MAC layer of the RTA session parameters. The parameters that are used for channel access includes: (a) maximum RTA packet length; (b) maximum number of packets to be received for each channel access; (c) RTA packet channel access periodicity; (d) expected time the RTA packet is to be generated and sent to the MAC; and (e) maximum delay tolerance.

Figures 21, 22, 23:
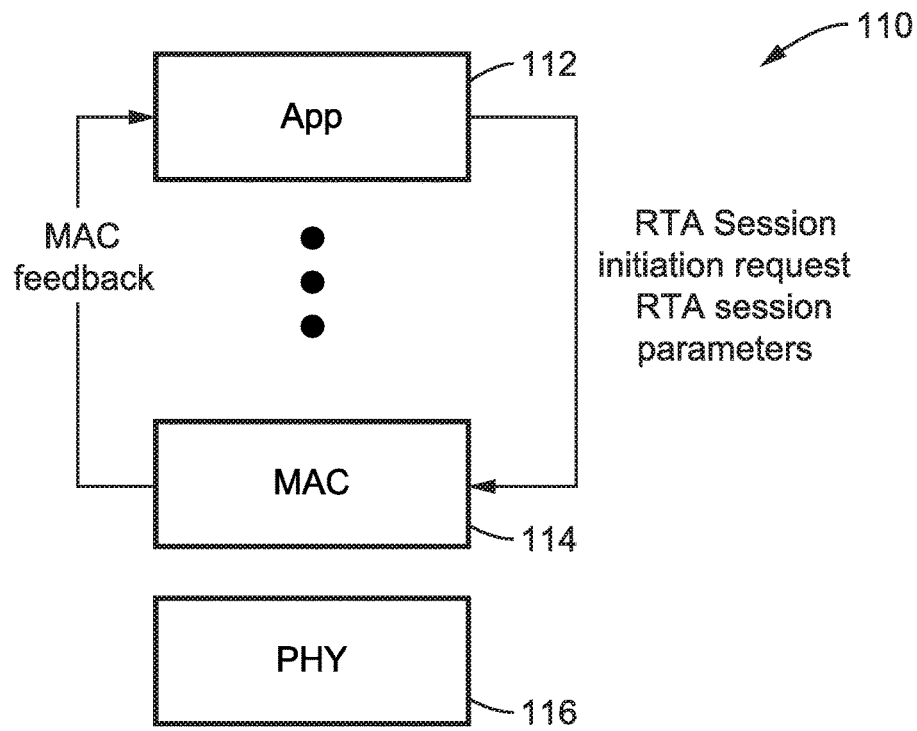
FIG. 21 is a block diagram of primitive parameter communication utilized according to at least one embodiment of the present disclosure.
FIG. 22 is a data field diagram of a New Session request having channel access parameters according to at least one embodiment of the present disclosure.
FIG. 23 is a data field diagram of primitive parameters for a response to the New Session request according to at least one embodiment of the present disclosure.

FIG. 21 illustrates an example embodiment 110 in which primitive parameters from the application layer or any other higher layer 112 are sent to the MAC layer 114 above PHY layer 116.

FIG. 22 illustrates an example embodiment 130 of a New Session request having channel access parameters, including at least the following. (a) A New Session Request is a field indicating that the Application layer is initiating a new RTA session if set to a first state. If not set to this first state, the following parameter represents an update to the previously initiated RTA session. It should be appreciated with this and other fields described in the document that either positive or negative logic may be utilized for single bit True/False fields, and any desired form of representation for multi-bit fields without departing from the teachings of the present disclosure. The MAC layer should initiate an RTA session upon receiving a new session request and accepting it. The details of initiating the RTA session are discussed in the following sections.

(b) A Session ID field is utilized by the application layer to indicate a session ID in referring to the initiated RTA session. The MAC layer associates the following parameters to the session ID. Any further communication between the higher layer and MAC layer regarding this RTA session should include this session ID. This includes updating, deleting or modifying the RTA session.

(c) A Maximum RTA Packet Length field represents the maximum size of each packet delivered to the MAC layer in bits or with respect to time. The MAC layer uses this information to estimate the time needed for each channel access for the RTA.

(d) A Number of Packets to be Received field for each channel access refers to the maximum number of packets to be delivered to the MAC layer for each RTA channel access. The MAC layer uses this information to estimate the time needed for each channel access for the RTA. It should be appreciated that the previous two variables can be combined into one variable if the higher layer sends the time required in each channel access instead of the number of packets and packet size.

(e) An RTA Packets Channel Access Periodicity field represents the time the MAC layer should expect the next RTA packets to arrive after one expected time for the RTA packet. This is the periodicity of the channel access for the RTA packets. The MAC layer uses this information to estimate the time where RTA packets will be arriving from the higher layer.

(f) Maximum Delay Tolerance is a field representing the maximum delay tolerated by the packet received from the high layers. The MAC layer might drop the packets and not keep trying to deliver it after the maximum delay tolerance is expired.

(g) Session Life Time is a field representing how long (duration) that the RTA session is active. This can be represented as a time relative to the start of the RTA packet generation time, or can be represented in terms of a number of periodic cycles of RTA packet transmission. The MAC layer is expecting the RTA packet arrival for the period of time defined by the session life time.

FIG. 23 illustrates an example embodiment 150 of primitive parameters of the response to the New Session request that the MAC layer can send to higher layers in response to the RTA stream initiation and received parameters, which as described below.

(a) A Response field indicates if the requirements received are achieved as is. If set to a first state (e.g., one) then the application layer need not change its parameters. If set to a second state (e.g., zero), the application layer should either accept the suggested parameters or resend a new set of parameters.

(b) Session ID field indicates which RTA session this response and parameter refers to. The application layer uses this information to match the session ID with all other RTA running sessions.

(c) Maximum RTA Packet Length field represents the suggested maximum size of each packet delivered to the MAC layer in bits or time in case the response was zero. The MAC layer uses this information to estimate the time needed for each channel access for the RTA.

(d) Maximum number of packets to be received for each channel access is a field representing the suggested maximum number of packets to be delivered to the MAC layer for each RTA channel access in case the response number of packets is indicates as zero. The MAC layer uses this information to estimate the time needed for each channel access for the RTA. It should be noted that the above two fields can be combined into one variable if the higher layer sends the time required in each channel access instead of the number of packet and packet size.

(e) An RTA Packets Channel Access Periodicity field represents the suggested time the MAC layer can expect the next RTA packets to arrive after one expected time for the RTA packet in case the response field in the message was set to zero. This is the periodicity of the channel access for the RTA packets. The MAC layer uses this information to estimate the time where RTA packets will be arriving from the higher layer.

(f) A Maximum Delay Tolerance field represents the suggested maximum delay tolerated by the packet received from the high layers in case the response field in the message was set to zero. When the response is zero this indicates that the MAC layer is suggesting a new parameter to the APP layer and is not accepting the parameter requested by the APP layer. The MAC layer might drop the packets and not keep trying to deliver it after the maximum delay tolerance is expired.

(g) A Session Life Time field represents how long the RTA session is active, and can be specified in time relative to the start of the RTA packet generation time, or it can be specified in terms of the number of periodic cycles of RTA packet transmission. The MAC layer is expecting the RTA packet arrival for the period of time defined by session life time.

7.2. Contention and Channel Statistics

To allow the STA to prepare for RTA packet transmission at the appropriate time, the STA needs to collect statistics about how busy the channel is. If the channel is completely free, the STA can access the channel without contention. If the channel is occupied, the STA is configured to wait for the channel to be free and run a back-off timer to access the channel. Once the timer expires the STA can access the channel. To make certain that the RTA packet is delivered on time the channel should be reserved, or about to be reserved, at the time when the packet arrives. The STA needs to know the statistics of the channel to make the right decision about when to try and access the channel.

Channel statistics can comprise one or more of the following. (a) Number of STAs which are accessing the channel, and this can be further divided into: (a)(i) number of STAs around accessing the channel from the same BSSID where the STA is part of; (a)(ii) number of STAs around accessing the channel and belongs to a different BSSID than the one the STA is part of; and (a)(iii) number of STAs around accessing the channel and it can't be detected which BSSID it is part of. It will be noted that the STA can utilize the detected PHY headers and possibly MAC header to estimate the statistics. (b) Percentage of time the channel is occupied by other STAs, which can be furtherly divided into: (b)(i) percentage of time the channel is occupied by STAs of the same BSSID; (b)(ii) percentage of time the channel is occupied by STAs of different BSSID; and (b)(iii) percentage of time the channel is occupied by STAs where the BSSID is not identified. It should be noted that the STA can utilize the detected PHY headers and possibly MAC header to estimate these statistics. (c) Channel delay access time represents the average time for accessing the channel once a packet is ready to be transmitted. (d) Back-off timer interruption statistics represent the statistics for the number of times the back-off timer is interrupted.

It will be noted that the STA does not have to be awake at all times to collect these statistics, for example the STA can wake up (periodically or in response to state/inputs) and calculate these statistics every period of time. The STA can also only collect the statistics while it is trying to access the channel which allows the STA to conserve energy and thus it does not need to wake up solely for the purpose of collecting statistics.

7.3. Early Contention Window Period

Once the STA establishes an RTA session it starts running a timer for the next RTA packet arrival. According to the present disclosure, the STA can contend for channel access even before RTA packet arrival. This is to avoid someone gaining access to the channel immediately prior to packet arrival. If the channel is busy during the period of time before packet arrival by the early contention window period, the STA should start contention. If the channel is free during that time, the STA continues to monitor the status of the channel. The size of the early contention window period should be related to the collected statistics, where the statistics are showing that the channel is more highly occupied (e.g., more STAs, more time the channel is occupied, higher channel access delay or higher back-off timer interruption ratio). The early contention window period length can be manually set to a fixed value or can be dynamically adjusted according to channel statistics.

Figure 24:
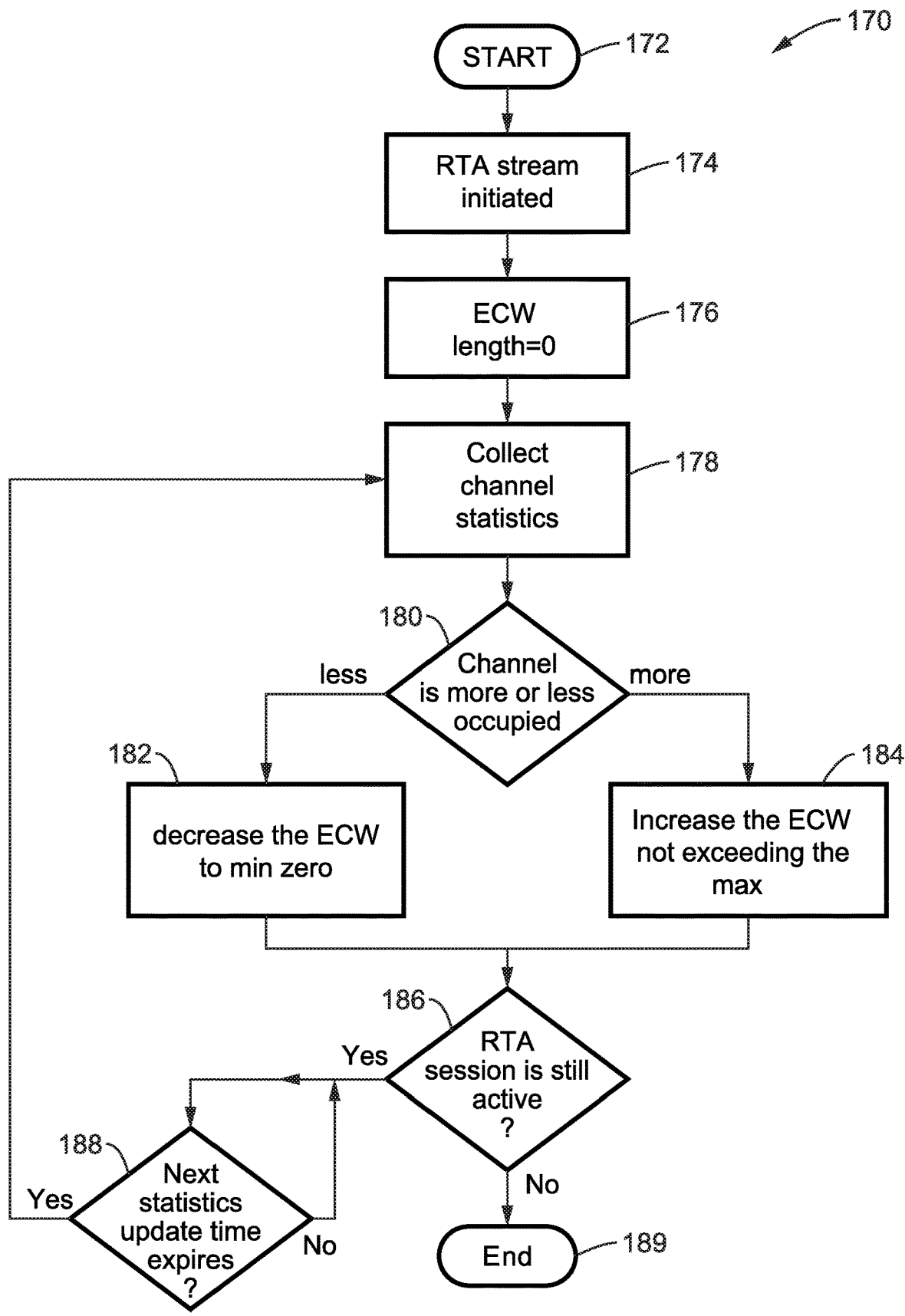
FIG. 24 is a flow diagram of dynamic adjustment of the early contention window period according to at least one embodiment of the present disclosure.

FIG. 24 illustrates an example embodiment 170 representing dynamic adjustment of the early contention window period. Once the routine begins 172 an RTA session is initiated 174, and the early Contention Window (ECW) period is set to zero or an initial value 176. Over a period of time the statistics of the channel are updated, depicted in this flow chart as a loop, and the more the channel is congested the more the ECW period is increased in value. Once the channel is less congested, the value of the ECW period decreases.

In particular, channel statistics are collected 178, then a check made 180 if the channel is more or less occupied. This determination depends on a threshold level, above which the channel is considered "more" occupied, and below which it is considered "less" occupied. If found to be less occupied, then execution reaches block 182 and the ECW period value is decreased toward a minimum value (e.g., zero). Alternatively, if found to be more occupied, then execution reaches block 184 and the ECW period value is increased toward a maximum value. A check is made 186 if the RTA session is still active. If it is still active, then timer expiration is awaited 188 with a return to block 178; otherwise execution ends 189.

It will be noted that for the sake of simplicity of illustration this and other flow diagrams depict the flow simply in a time-linear manner. However, it will be appreciated that the steps being executed can be performed in a multitasking or multikernel environment, where steps in the flowchart are being performed in its task and/or thread while other actions are being performed for other tasks and/or threads.

7.4. Early Channel Access Window

The STA running RTA may occupy the channel before the RTA packet estimated arrival time to guarantee that no other stations will occupy the channel at that time. The period of time before the estimated arrival of the RTA packet that the STA is allowed to occupy the channel is the early channel access window (ECAW). During this time if the STA decides to gain access to the channel, the STA starts transmitting packets to the intended STA, or any other STA, on condition that by the estimated RTA packet arrival time the STA will be ready to transmit the RTA packets. If the STA does not have any packet to transmit during the ECAW and it needs to occupy the channel, the STA transmits a null or dummy packet for the sake of occupying the channel and not allowing anyone else to use the channel. ECAW is expected to be a small period of time and should not result in over occupying the channel with unnecessary transmissions.

7.5. RTA Pre-Packet Arrival Channel Contention AP Enablement

An AP can commence early contention for the channel at any time once it has an active RTA session. A non-AP STA should acquire approval by the AP prior to performing early contention for the RTA packets. For example, a non-AP STA sends a request of pre-packet arrival channel contention to the AP of the BSS that it is part of. In at least one embodiment, the request contains the parameters that the non-AP is requesting to use (Early Contention Window (ECW), or Early Contention Access Window (ECAW)). The AP can accept the non-AP use of early contention or reject it. In rejecting the non-AP use of the requested parameter, the AP can a suggest new set of parameters. In this case the non-AP STA should re-request the enablement of the pre-packet arrival channel contention with the new suggested parameters. At any point of time while the RTA session is active, the non-AP STA is able to send a request to update the ECW and the ECAW parameters. The AP should accept the pre-contention parameter requested by the non-AP STA.

Figure 25:
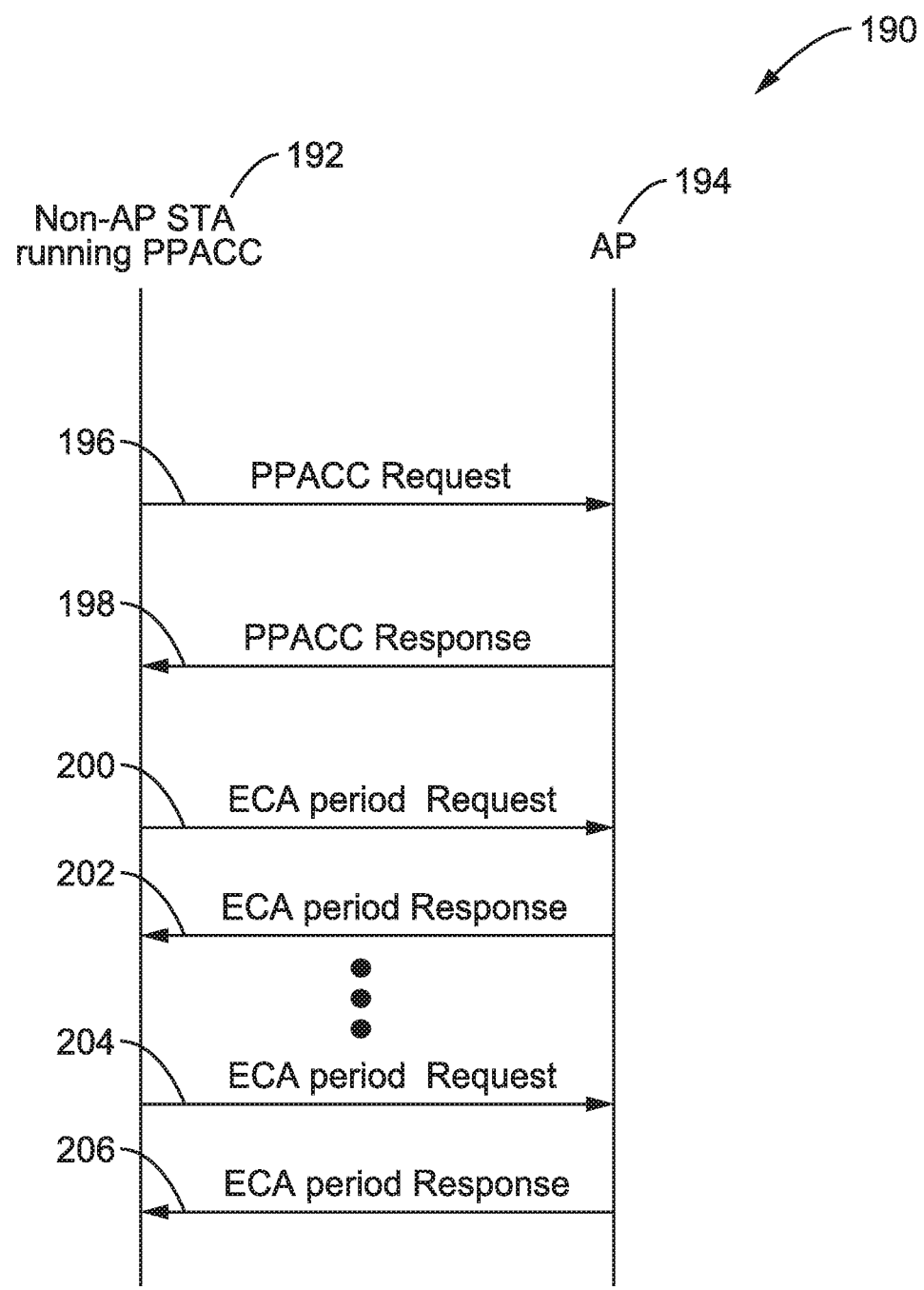
FIG. 25 is a communication sequence diagram exemplifying an exchange between a non-AP its AP according to at least one embodiment of the present disclosure.

FIG. 25 illustrates an example embodiment 190 of a communication exchange between a non-AP 192 STA and its AP 194. A non-AP STA sends a Pre-Packet Arrival Channel Access (PPACC) Request 196 to the AP it is associated to. The AP responds to this request with PPACC Response 198, which includes a rejection or acceptance to the request. If the request is rejected it can include new suggested PPACC parameters. In this case the non-AP can repeat the request to the AP with the new suggested parameters.

When the request is approved, the non-AP STA can update the periods for the early contention at any time by sending early contention access request 200. The AP can approve or reject the period change request through the early contention access response 202. Multiple early contention access request and response exchanges 204, 206 can be performed.

8. Pre-Packet Arrival Channel Contention Procedure

Figure 26A:
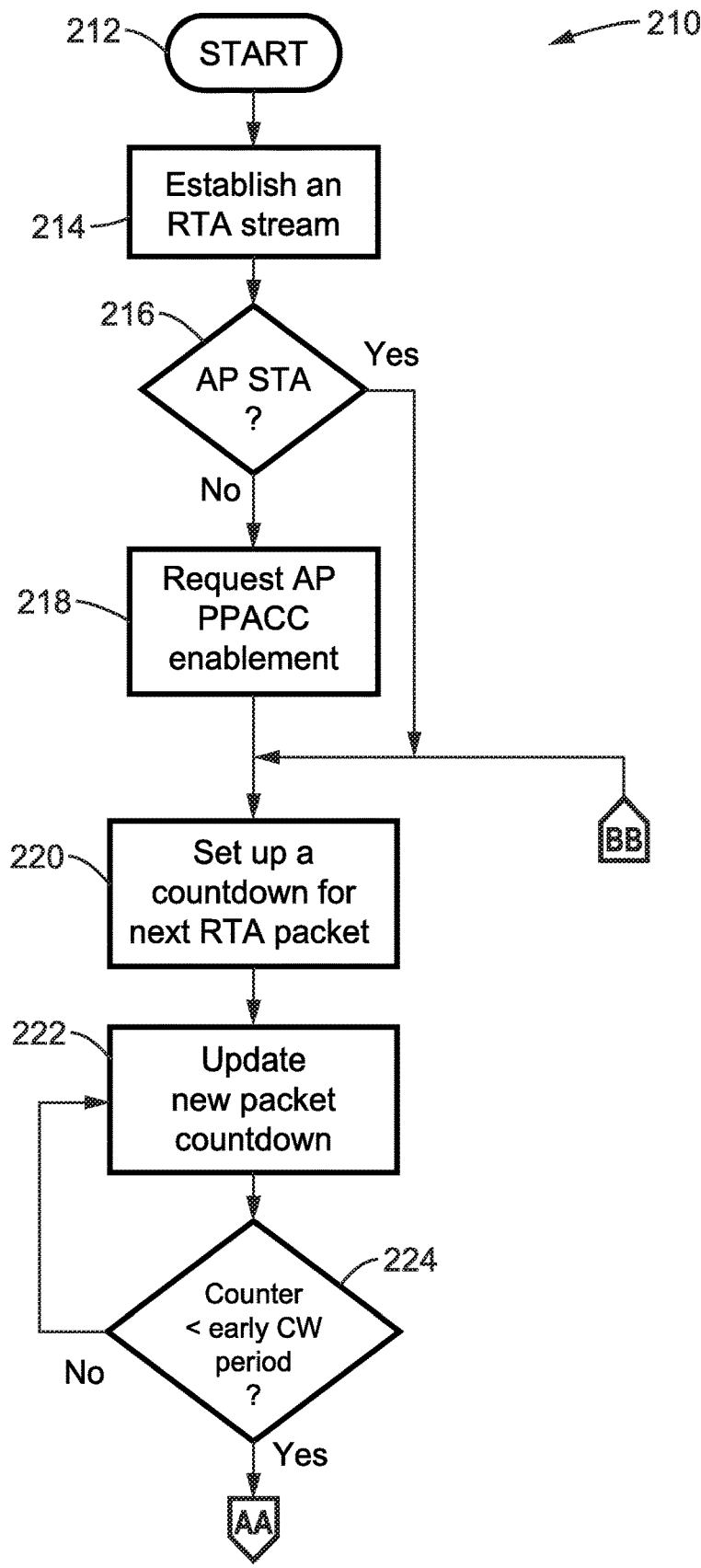
FIG. 26A and FIG. 26B is a flow diagram of a station performing a Pre-Packet Arrival Channel Contention (PPACC) procedure according to at least one embodiment of the present disclosure.
Figure 26B:
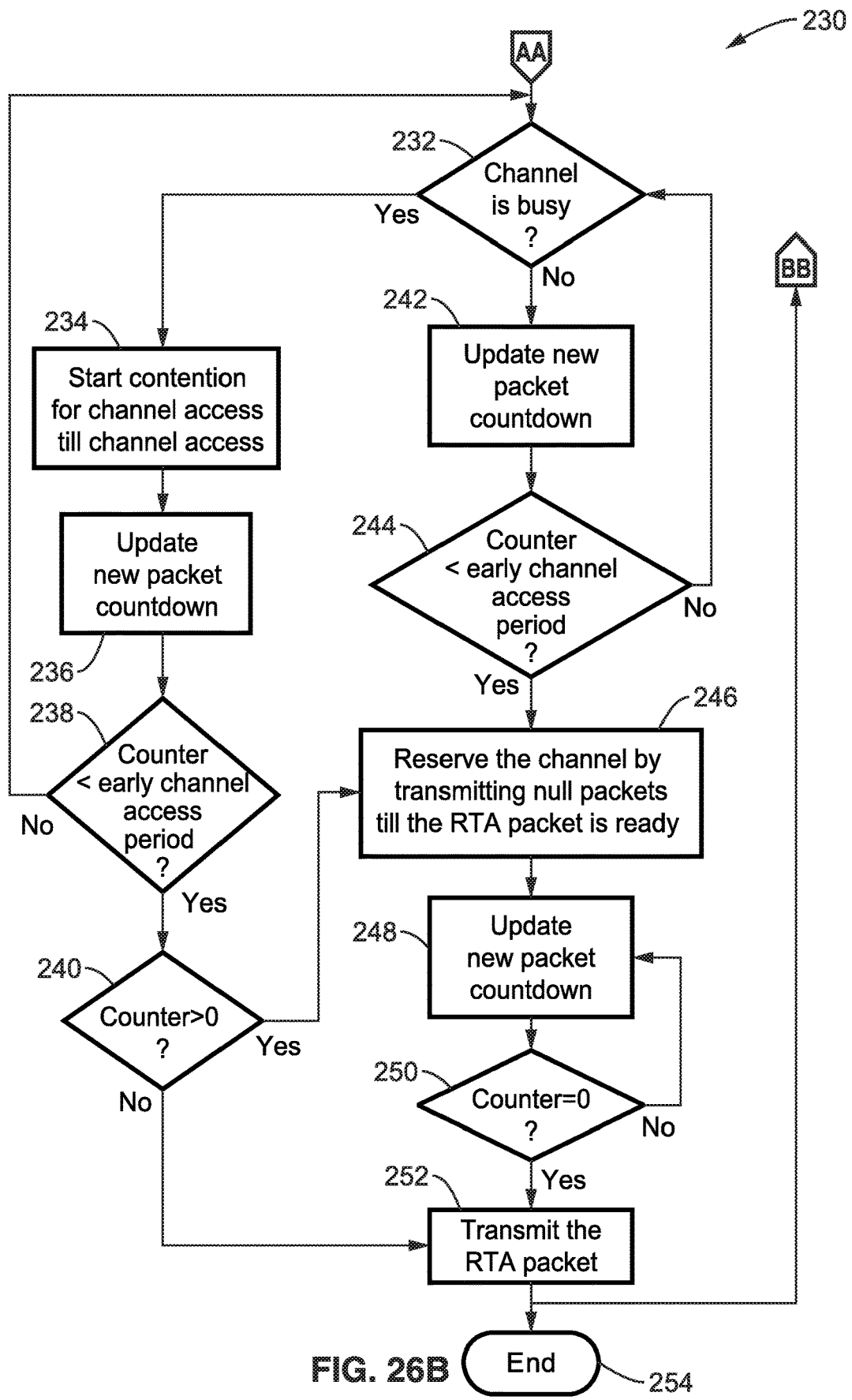

FIG. 26A and FIG. 26B illustrate an example embodiment 210, 230 of a STA performing the PPACC procedure once it gets a request from the higher layers to start an RTA session. The procedure starts 212 and a STA receiving RTA request from higher layers first establishes 214 the RTA stream and performs the steps necessary to get it ready for transmission. A check is made 216, if the STA is an AP STA. If it is not an AP station, then in block 218 it sends a request to the AP first to enable the PPACC procedure, before reaching block 220. Otherwise, if the STA is an AP it can start using the procedure directly, and reaches block 220. The STA sets up a count down 222 to the next RTA packet transmission. It uses the information from the high layer about the estimated time to receive the RTA packet from the higher layer and adds to it any additional delays for buffering or preparing the packet. The STA keeps monitoring 222, 224 the count-down timer (counter/timer) until the value of the count-down timer reaches the early contention window period, at which time execution reaches block 232 of FIG. 26B since the count-down timer has reached the early contention window period, so the STA checks for the status of the channel. If the channel is not busy the STA will keep monitoring it by updating 242 packet countdown, and checking 244 for the counter being less than the early channel access period. If the counter is less than the early channel access period, then a return is made to block 232 with another check for channel busy, otherwise execution reaches block 246.

If block 232 detects at any time the channel is busy the STA starts 234 a contention procedure, to give higher priority for the STA to access the channel immediately after the channel becomes free again. The packet countdown value is updated 236, and if it is found at check 238 that the counter is less than the early channel access period, then execution returns to block 232. Otherwise, execution reaches block 240 checking if the counter is still greater than zero. If the counter is not greater than zero then block 252, which is described below, is reached. Otherwise if the counter has not reached zero as determined at block 240, then at block 246 the STA reserves the channel by transmitting null or dummy packets until the RTA packet is ready, and then updates 248 the packet countdown, checks 250 for the counter reaching zero, and loops with block 248 until the counter has reached zero, at which time block 252 is reached which transmits the RTA packet and the process ends 254.

Thus, it has been shown that if the STA gained access to the channel before the early channel access period, the STA keeps monitoring the channel and does not start accessing the channel. If the STA gained access to the channel after the early channel access period, then the STA starts accessing the channel to transmit the RTA packet if it is ready to send dummy packets or padding (null packets) to reserve the channel until the RTA packet is available. If the channel remained in a not busy (free) state until the early channel access period, then the STA should access the channel to transmit dummy packets or padding for reserving the channel until the RTA packet is available.

9. Pre-Packet Arrival Channel Contention Examples

In this section are presented numerous example scenarios for Pre-Packet Arrival Channel Contention (PPCAA) and how each are addressed by the disclosed procedure.

FIG. 27 illustrates an example embodiment 270 of handling a channel busy situation at the beginning of the early channel Contention Window (CW) period, showing operations during channel busy 282, back-off period 284, null packet sending 286 and RTA packet sending 288 for this situation. Pre-packet arrival channel sensing is performed 272 and the channel monitored 274. The STA starts a contention access process during the busy period to gain access to the channel. The STA gains access 277 to the channel during an early channel access period 278, which extends to the time of RTA packet arrival 280. Early channel access period 278 is the latter part of the early CW period 276, which extends from the time of pre-packet arrival to the time of RTA packet arrival 280. The STA reserves the channel by sending nulls 286 to itself until the RTA packet 288 is ready for transmission. The STA can thus transmit a null or other extraneous placeholding packet often referred to as 'dummy packet', to reserve the channel so that other STAs are unable to access the channel until the RTA is ready. It will be appreciated that for the sake of the simplicity of illustration, the term null packet will be utilized herein, but should be understood to mean the use of any desired forms of placeholder (dummy) packets.

FIG. 28 illustrates an example embodiment 290 of handling channel busy condition at the beginning of the early channel CW period, showing operations in relation to channel busy 292, back-off 294, non-busy periods 296, and the sending of null packets (or similar) 298, across an early CW period 304 as well as RTA packet 300. Pre-packet arrival sensing 302 commences, with the channel being monitored 303, and the STA begins contention and gains access to the channel, starting a back-off interval 294 at the early CW period and before the early channel access period 306. The STA, however, does not reserve the channel and thus keeps monitoring the channel, which becomes available 296 (non-busy). As the early channel access period 306 begins, the STA reserves the channel to itself until RTA packet arrival 308, such as by transmitting a null or dummy packet to reserve the channel so that no other STAs can access the channel until the RTA packet is arrives 308, and is this RTA packet 300 is transmitted.

Figure 29:
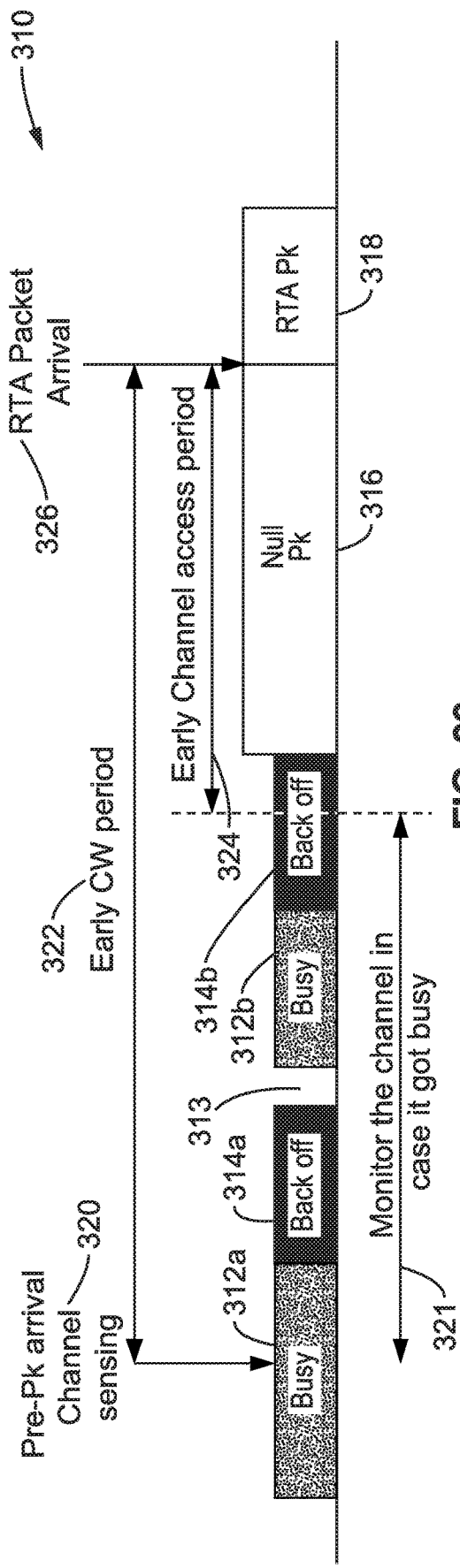
FIG. 29 is a channel access diagram depicting handling another channel busy situation at the beginning of the early channel Contention Window (CW) period according to at least one embodiment of the present disclosure.

FIG. 29 illustrates an example embodiment 310 of handling a channel busy situation at the beginning of the early channel CW period 322, showing busy 312a, 312b, back-off intervals 314a, 314b, sending null packets 316 and STA packets 318. Pre-packet arrival sensing 320 commences, with the channel being monitored 321, during a busy period 312a with the STA starting contention and gains channel access of the channel with back-off period 314a prior to the early channel access period. The channel becomes inactive 313, then is busy 312b and the STA gains access to the channel and starts a back-off period 314b during which the early CW period begins. In the early channel access period 324, the STA begins transmitting null or dummy packets 316 to reserve the channel so that no other STA can access the channel until RTA packet arrival 326 and transmission 318.

It will be seen above that the STA does not reserve the channel and continues monitoring the channel until the early channel access period. If the channel gets busy again, the STA starts contention again and once it gains access to the channel it reserves the channel to itself until the RTA packet is ready to be transmitted.

Figure 30:
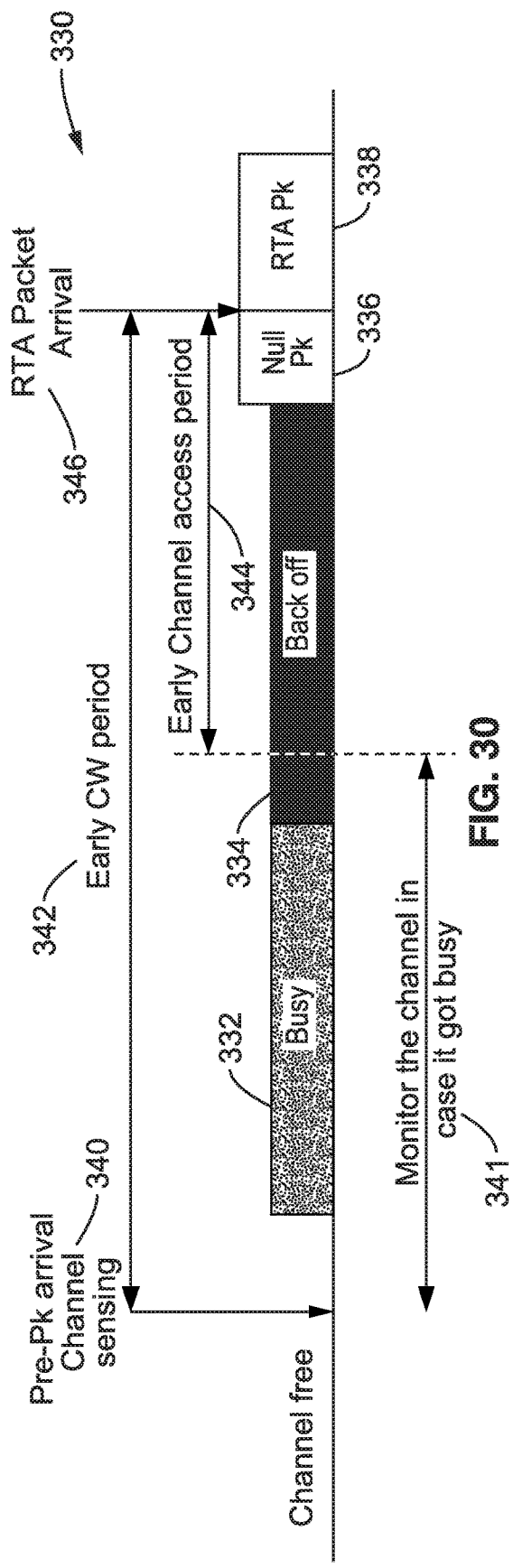
FIG. 30 is a channel access diagram depicting handling a situation in which the channel is not busy at the beginning of an early channel Contention Window (CW) period according to at least one embodiment of the present disclosure.

FIG. 30 illustrates an example embodiment 330 of handling the scenario in which the channel is not busy at the beginning of an early channel Contention Window (CW) period. The figure depicts channel busy 332, back-off interval 334, sending null packet(s) 336 and STA packet 338. Pre-packet arrival channel sensing 340 commences during the early CW period 342 with the STA monitoring 341 channel status. In this example, the channel became busy during the early CW period but before the early channel access period 344. The STA starts contending to gain access of the channel, and upon gaining channel access it commences a back-off period 334 which extends into the early channel access period 344. The STA reserves the channel to itself until the RTA packet is ready to be transmitted, such as by transmitting a null or dummy packet 336 to reserve the channel so that other STAs cannot access the channel until RTA packet arrival 346 and the RTA packet 338 is transmitted.

FIG. 31 illustrates an example embodiment 350 of a scenario in which the channel is not busy at the beginning of the early channel CW period. The figure depicts sending null packet(s) 352 and STA packets 354. Pre-packet arrival channel sensing 356 is seen occurring when the channel is not busy in the early CW period 358. The channel remains available (not busy) during the early CW period and before the early channel access period 360. The STA reserves the channel to itself at the start of the early channel access period 360, such as by transmitting a null or dummy packet 352 to reserve the channel, so that no other STA can access the channel until RTA packet arrival 362 and sending of RTA packet 354.

FIG. 32 illustrates an example embodiment 370 of a scenario in which the channel remains busy from before the early channel CW period 380 and into the early channel access period 382. The figure depicts channel busy 372, back-off interval 374, and transmitting STA packets 376. From the time of pre-packet arrival channel sensing 378 and during early CW period 380 the STA monitors 379 the channel status. The STA starts contending to gain access of the channel. The channel remains available (free) before RTA packet arrival 384 and the STA starts the back-off timer 374. The STA gains access to the channel after estimated RTA packet arrival time 384 is reached, and then it is seen transmitting the RTA packet 376.

Figure 33:
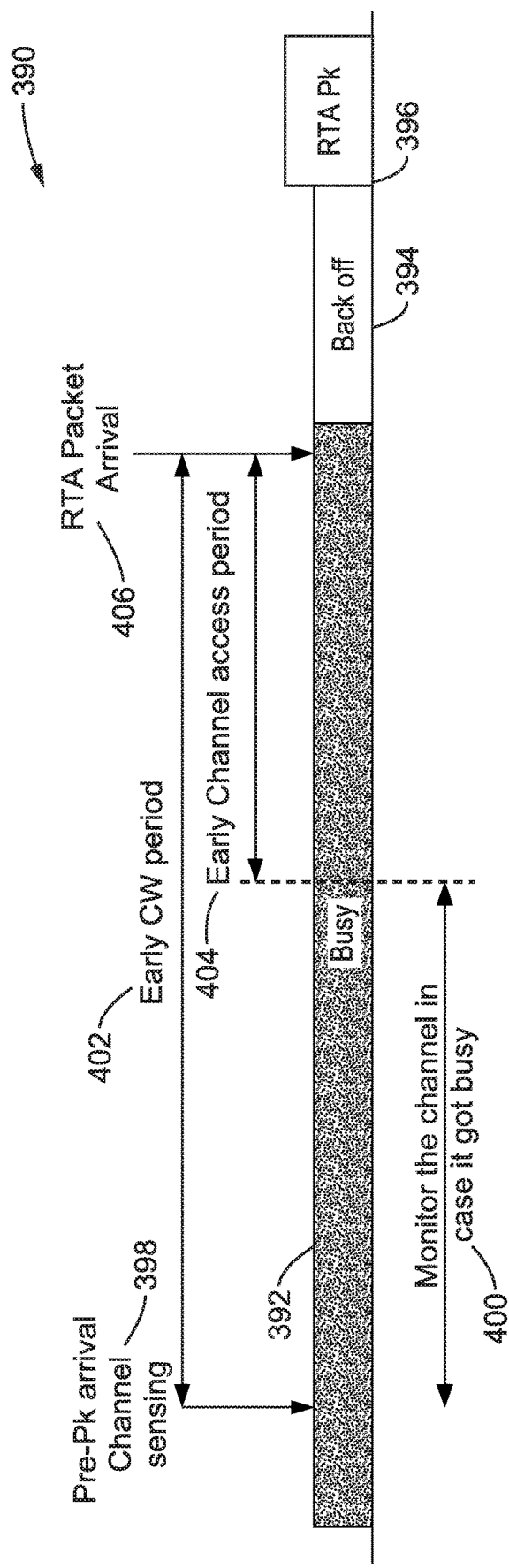
FIG. 33 is a channel access diagram depicting handling a scenario in which the channel is busy at the beginning of the early channel CW period according to at least one embodiment of the present disclosure.

FIG. 33 illustrates an example embodiment 390 of a scenario in which the channel is busy at the beginning of the early channel CW period. The figure depicts channel busy 392, back-off interval 394, and transmitting STA packets 396. From the pre-packet arrival channel sensing 398 and during early CW period 402 the STA monitors 400 channel status. The STA starts contending to gain channel access during the early channel access period 404, and the channel becomes free after the RTA packet arrival time 406 and the STA starts a back-off period 394. The STA gains access to the channel after the estimated RTA packet arrival time 406, and transmits the RTA packet 396 after the back-off period 394.

10. Frame Format 10.1. PPACC Request

Figure 34:
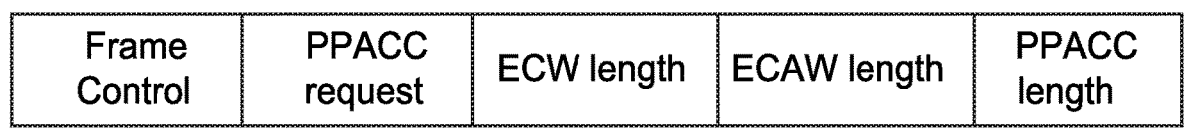
FIG. 34 is a data field diagram of a Pre-Packet Arrival Channel Contention (PPACC) request frame according to at least one embodiment of the present disclosure.

FIG. 34 illustrates an example embodiment 410 of a Pre-Packet Arrival Channel Contention (PPACC) frame which is sent by a non-AP STA to the AP STA it is associated to in its BSS to request using the Pre-Packet Arrival Channel Access procedure. The non-AP STA is expecting a response from the AP STA to accept or reject the request. The fields of this PPACC frame are as follows. (a) A Frame Control field contains all the necessary information to identify the frame. (b) A PPACC Request field is set to a first state (e.g., 1) to indicate that the non-AP STA is requesting a PPACC procedure enablement. The AP STA compares request field to the network setting and approves or rejects this request. (c) An ECW Length field indicates the requested ECW period length (time for example) to be used by the non-AP during the PPACC procedure. The AP STA compares this to the network setting and approves or rejects this value. (d) An ECAW Length field indicates the requested ECAW period length (time for example) to be utilized by the non-AP during the PPACC procedure. The AP STA should compare this to the network setting and approve or reject this value. (e) A PPACC length field indicates the period the PPACC is requested to be active in the non-AP STA. If this request is approved the STA will be running the PPACC for this period length (time or number of beacon intervals). A value of zero indicates unlimited time periods.

10.2. PPACC Response

Figure 35:
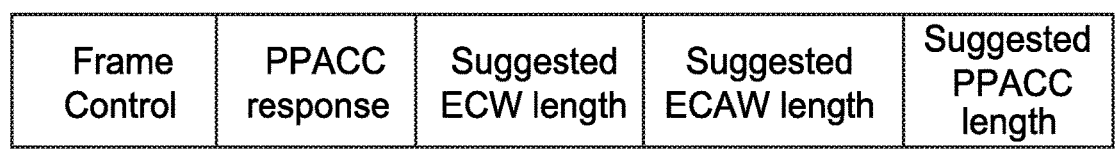
FIG. 35 is a data field diagram of a Pre-Packet Arrival Channel Contention (PPACC) response frame according to at least one embodiment of the present disclosure.

FIG. 35 illustrates an example embodiment 420 of a PPACC response frame which is sent by an AP STA to the non-AP STA in its BSS in response to a request to use the Pre-Packet Arrival Channel Access procedure. The non-AP STA is expecting the response from the AP STA to accept or reject the request. The fields of the PPACC response frame are as follows. (a) A Frame Control field contains all the necessary information to identify the frame. (b) A PPACC Response field is set to a first state (e.g., 1) to indicate that the non-AP STA is accepting the PPACC request for the PPACC procedure enablement otherwise it is rejected. The STA receiving this response will enable the PPACC procedure if the response is such that the request is accepted. If the response indicates a rejection, then the non-AP STA can resend this request with other parameters. (c) A Suggested ECW Length field only exists if the PPACC Response is set to 0. This indicates the suggested ECW period length to be used by the non-AP during the PPACC procedure in case the request is rejected, but the AP is still willing to enable the PPACC procedure for the non-AP STA under the suggested conditions. The AP sets this field to 0 if it is not willing to enable the PPACC procedure for the non-AP STA. (d) A Suggested ECAW Length field only exists if the PPACC Response is set to 0, which indicates the suggested ECAW period length to be used by the non-AP during the PPACC procedure in case the request is rejected, yet the AP is still willing to enable the PPACC procedure for the non-AP STA. The AP sets this field to 0 if it is not willing to enable the PPACC procedure for the non-AP STA. (e) A Suggested PPACC length field only exists if the PPACC Response is set to 0. This indicates the suggested PPACC length to be used by the non-AP during the PPACC procedure in case the request is rejected and the AP is still willing to enable the PPACC procedure for the non-AP STA. The AP sets this field to 0 if it is not willing to enable the PPACC procedure for the non-AP STA.

10.3. Early Contention Access Request

Figure 36:
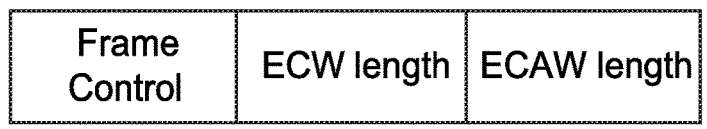
FIG. 36 is a data field diagram of an early contention access request frame according to at least one embodiment of the present disclosure.

FIG. 36 illustrates an example embodiment 430 of an early contention access request frame as sent by a non-AP STA to the AP STA that it is associated to in its BSS to request updating the parameters of the Pre-Packet Arrival Channel Access procedure. The non-AP STA is expecting a response from the AP STA to accept or reject the request. The fields are as follows. (a) A Frame Control field contains all the necessary information to identify the frame. (b) An ECW Length field indicates the requested updated ECW period length (time for example) to be used by the non-AP during the PPACC procedure. The AP STA can compare this to the network setting and approve or reject this value. (c) An ECAW Length field indicates the requested ECAW period length (time for example) to be used by the non-AP during the PPACC procedure. The AP STA should compare this to the network setting and approve or reject this value.

10.4. Early Contention Access Response

Figure 37:
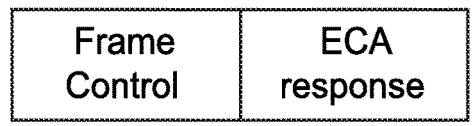
FIG. 37 is a data field diagram of an early contention access response frame according to at least one embodiment of the present disclosure.

FIG. 37 illustrates an example embodiment 440 of an Early Contention Access response frame which is sent by an AP STA to the non-AP STA in its BSS in response to a request to update the parameters of the Pre-Packet Arrival Channel Access procedure. The non-AP STA is expecting the response from the AP STA to accept or reject the request. The fields of the Early Contention Access Response frame as follows. (a) A Frame Control field contains all the necessary information to identify the frame. (b) An Early Contention Access Response field is set to a first state (e.g., 1) to indicate that the non-AP STA is accepting the Early Contention Access request for the PPACC procedure enablement otherwise it is rejected. The STA receiving this response will update the Early Contention Access parameters of the PPACC procedure if the response is such that the request is accepted.

11. Summary

Each STA keeps track of the active RTA session and identifies the running RTA session by: (a) rate of packet arrival; (b) size of packet to be sent; (c) expected time of packet arrival; and (d) end of the RTA session.

The STA is aware of the time the packet arrives to the MAC queue and attempts to gain access to the channel before packet arrival from information provided by the application layer to the MAC layer of the WLAN device.

In order to maintain fairness in its resource sharing, in at least one embodiment pre-packet arrival channel access is only allowed if the amount of data to be sent is limited, such as less that a specific amount or only a limited period of time or limited Transmit Opportunity (TXOP) (e.g., less than specific amount). It will be noted that TXOP is the amount of time a station can send frames when it has won contention for the wireless medium.

The STA keeps track of (monitors) statistics that quantify the expected pre-packet channel contention. Every time the STA accedes (releases or relinquishes) the channel and its pre-packet statistics are updated.

A STA request from the AP to run the RTA pre-packet contention procedure through exchanging messages or communicating request and response with the AP. Once accepted, the STA can request to change the procedure parameter through exchanging parameter update messages with the AP. The STA runs a count down timer from the last packet arrival time to estimate the next arrival time for the new packet. The STA shall start contending for the channel before the counter expires by a time offset related to the collected statistics of the channel contention time or manually defined if the channel was busy at any time after the timer reaches the threshold. In at least one embodiment, this time offset is bounded by a specific amount (e.g., for example 1 TXOP) and should not exceed that amount. If the channel is not busy the STA continues monitoring the channel.

The STA shall gain access to the channel if it is not busy before the counter expires by a time offset related to the collected statistics or to a manually defined value. This offset is less than the offset of contention for the channel. The STA occupies the channel by sending null or dummy packets until RTA packet arrival.

12. General Scope of Embodiments

The enhancements described in the presented technology can be readily implemented within various wireless stations, including access points (APs), configured for operation in wireless networks. It should also be appreciated that wireless stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with wireless network communication. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating with at least one other wireless local area network (WLAN) station in its reception area; (b) a processor coupled to said wireless communication circuit within a station configured for operating on the WLAN; and (c) a non-transitory memory storing instructions executable by the processor; (d) wherein said instructions, when executed by the processor, perform one or more steps comprising: (d)(i) operating said wireless communication circuit as a WLAN station configured to support at least one real-time application (RTA) that is sensitive to communication delays; (d)(ii) tracking active real-time application sessions and identifying running real time application (RTA) sessions with respect to communication times, rates and packet sizes; and (d)(iii) attempting to gain access to a communication channel before a packet arrives in a pre-packet arrival channel contention process based on information provided by an application layer of the at least one real-time application on what time the packet will arrive to a MAC queue in a MAC layer of said WLAN station.

2. An apparatus for wireless communication in a network, the apparatus comprising: (a) a wireless communication circuit configured for wirelessly communicating with at least one other wireless local area network (WLAN) station in its reception area; (b) a processor coupled to said wireless communication circuit within a station configured for operating on the WLAN; and (c) a non-transitory memory storing instructions executable by the processor; (d) wherein said instructions, when executed by the processor, perform one or more steps comprising: (d)(i) operating said wireless communication circuit as a WLAN station configured to support at least one real-time application that is sensitive to communication delays; (d)(ii) tracking active real-time application sessions and identifying running real time application (RTA) sessions with respect to communication times, rates and packet sizes in the form of rate of packet arrival, size of packet to be sent, expected time of packet arrival, and end of a real-time application session; (d)(iii) attempting to gain access to a communication channel before a packet arrives in a pre-packet arrival channel contention process based on information provided by an application layer of the at least one real-time application (RTA) on what time the packet will arrive to a MAC queue in a MAC layer of said WLAN station; and (d)(iv) tracking of statistics to update expected pre-packet channel contention information by said WLAN station each time the communication channel is relinquished.

3. A method of performing wireless communication in a network, comprising: (a) operating said wireless communication circuit as a WLAN station configured to support at least one real-time application (RTA) that is sensitive to communication delays when wirelessly communicating with at least one other wireless local area network (WLAN) station in its reception area; (b) tracking active real-time application (RTA) sessions and identifying running RTA sessions with respect to communication times, rates and packet sizes; and (c) attempting to gain access to a communication channel before a packet arrives in a pre-packet arrival channel contention process based on information provided by an application layer of the at least one real-time application (RTA) on what time the packet will arrive to a MAC queue in a MAC layer of said WLAN station.

4. A method of wireless communication in a network in which wireless stations (STAs) perform: (a) keeping track of active RTA sessions and identifying the running RTA session by: (a)(i) rate of packet arrival; (a)(ii) size of packet to be sent; (a)(iii) expected time of packet arrival; (a)(iv) end of the RTA session; (b) determining, at the station, the time the packet arrives to the MAC queue and attempting to gain access to the channel before packet arrival in response to information provided by the application layer to the MAC layer of the WLAN device.

5. The apparatus or method of any preceding embodiment, wherein said instructions, when executed by the processor, perform one or more steps comprising determining said communication times, rates and packet sizes in the form of rate of packet arrival, size of packet to be sent, expected time of packet arrival, and end of a real-time application session.

6. The apparatus or method of any preceding embodiment, wherein said instructions, when executed by the processor, further perform one or more steps comprising determining if pre-packet arrival channel access is to be allowed based on amount of data to be sent and/or the period of channel access time.

7. The apparatus or method of any preceding embodiment, wherein said instructions, when executed by the processor, perform one or more steps comprising tracking of statistics to update expected pre-packet channel contention information by said WLAN station each time the communication channel is relinquished.

8. The apparatus or method of any preceding embodiment, wherein said instructions, when executed by the processor, perform one or more steps comprising sending a request from a non-access point (non-AP) station to the access point (AP) in its basic service set (BSS) to perform said pre-packet arrival channel contention process in response to exchanging one or more messages or requests between said WLAN station and the AP.

9. The apparatus or method of any preceding embodiment, wherein said instructions, when executed by the processor, perform one or more steps comprising the WLAN station requesting a change of procedure parameters through exchanging parameter update messages with the access point (AP), in response to receiving acceptance of performing said pre-packet arrival channel contention process by the AP.

10. The apparatus or method of any preceding embodiment, wherein said instructions, when executed by the processor, perform one or more steps comprising: (a) running a counter or timer from a last packet arrival time to an estimated next arrival time for a new packet; and (b) starting a process of contending for a channel before the counter or timer expires in relation to a time offset from statistics collected on channel contention time or manually defined if the channel was busy at any time after the counter or timer reached a threshold.

11. The apparatus or method of any preceding embodiment, wherein the time offset is bounded by a specific amount not to be exceeded.

12. The apparatus or method of any preceding embodiment, wherein said instructions, when executed by the processor, perform one or more steps comprising: (a) obtaining access to the channel if it is not busy before the counter or timer expires by a time offset related to the collected statistics or manually defined; (b) wherein the offset is less than the offset of contention for the channel; and (c) occupying the channel by said WLAN station by sending non-RTA packets, null, dummy packets until the packet arrives from the real-time application.

13. The apparatus or method of any preceding embodiment, wherein said instructions, when executed by the processor, further perform one or more steps comprising determining if pre-packet arrival channel access is to be allowed based on amount of data to be sent and/or the period of channel access time.

14. The apparatus or method of any preceding embodiment, wherein said instructions, when executed by the processor, perform one or more steps comprising sending a request from a non-access point (non-AP) station to the access point (AP) in its basic service set (BSS) to perform said pre-packet arrival channel contention process in response to exchanging one or more messages or requests between said WLAN station and the AP.

15. The apparatus or method of any preceding embodiment, wherein said instructions, when executed by the processor, perform one or more steps comprising the WLAN station requesting a change of procedure parameters through exchanging parameter update messages with the access point (AP) in response to receiving acceptance of performing said pre-packet arrival channel contention process by the access point (AP).

16. The apparatus or method of any preceding embodiment, wherein said instructions, when executed by the processor, perform one or more steps comprising: (a) running a counter or timer from a last packet arrival time to an estimated next arrival time for a new packet; and (b) starting a process of contending for a channel before the counter or timer expires in relation to a time offset from statistics collected on channel contention time or manually defined if the channel was busy at any time after the counter or timer reached a threshold.

17. The apparatus or method of any preceding embodiment, wherein the time offset is bounded by a specific amount not to be exceeded.

18. The apparatus or method of any preceding embodiment, wherein said instructions, when executed by the processor, perform one or more steps comprising: (a) obtaining access to the channel if it is not busy before the counter or timer expires by a time offset related to collected statistics or that is manually defined; (b) wherein the offset is less than the offset of contention for the channel; and (c) occupying the channel by said WLAN station by sending non-real time application (non-RTA) packets, null, or dummy packets until the packet arrives from the real-time application.

19. The apparatus or method of any preceding embodiment, further comprising sending a request from a non-access point (non-AP) station to the AP in its basic service set (BSS) to perform said pre-packet arrival channel contention process in response to exchanging one or more messages or requests between said WLAN station and the AP.

20. The apparatus or method of any preceding embodiment, further comprising: (a) running a counter or timer from a last packet arrival time to an estimated next arrival time for a new packet; and (b) starting a process of contending for a channel before the counter or timer expires in relation to a time offset from statistics collected on channel contention time, or that is manually defined, if the channel was busy at any time after the counter or timer reached a threshold.

21. The apparatus or method of any preceding embodiment, further comprising: (a) obtaining access to the channel if it is not busy before the counter or timer expires by a time offset related to the collected statistics or manually defined; (b) wherein the offset is less than the offset of contention for the channel; and (c) occupying the channel by said WLAN station by sending non-RTA packets, null, dummy packets until the packet arrives from the real-time application.

22. The apparatus or method of any preceding embodiment, further comprising: in order to maintain fairness, the pre-packet arrival channel access can only be allowed if the amount of data to be sent is limited (less that specific amount) or only allow channel access for a limited period of time or limited TXOP (less than a specific amount).

23. The apparatus or method of any preceding embodiment, further comprising: the STA keeping track of statistics that quantify the expected channel contention delay, and every time the STA is acceding the channel its delay statistics are updated.

24. The apparatus or method of any preceding embodiment, further comprising: a STA requesting from the AP to run the RTA pre-packet contention procedure through exchanging messages or requests and responses with the AP, and once accepted the STA can request to change the procedure parameter through exchanging parameters update messages with the AP.

25. The apparatus or method of any preceding embodiment, further comprising: the STA running a count time timer from the last packet arrival time to estimate the next arrival time for the new packet, and the STA starts contending for the channel before the counter expires by a time offset related to the collected statistics of the channel contention time or manually defined if the channel was busy at any time after the timer reaches the threshold, with this time offset bounded by a specific amount (for example 1 TXOP) and should not exceed that amount, and if the channel is not busy the STA keeps monitoring the channel.

26. The apparatus or method of any preceding embodiment, further comprising: the STA gaining access to the channel if it is not busy before the counter expires by a time offset related to the collected statistics or manually defined, with this offset being less than the offset of contention for the channel, and the STA occupies the channel by sending null or dummy packets until RTA packet arrival.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit configured for wirelessly communicating with at least one other wireless local area network (WLAN) station in its reception area;
   (b) a processor coupled to said wireless communication circuit within a station configured for operating on the WLAN; and
   (c) a non-transitory memory storing instructions executable by the processor;
   (d) wherein said instructions, when executed by the processor, perform one or more steps comprising:
      (i) operating said wireless communication circuit as a WLAN station configured to support at least one real-time application (RTA) that is sensitive to communication delays;
      (ii) tracking active real-time application sessions and identifying running real time application (RTA) sessions with respect to communication times, rates and packet sizes; and
      (iii) attempting to gain access to a communication channel before a packet arrives in a pre-packet arrival channel contention process based on information provided by an application layer of the at least one real-time application on what time the packet will arrive to a MAC queue in a MAC layer of said WLAN station;
      (iv) sending a request from a non-access point (non-AP) station to the access point (AP) in its basic service set (BSS) to perform said pre-packet arrival channel contention process in response to exchanging one or more messages or requests between said WLAN station and the AP; and
      (v) requesting a change of procedure parameters through exchanging parameter update messages with the access point (AP), in response to receiving acceptance of performing said pre-packet arrival channel contention process by the AP.

2. The apparatus of claim 1, wherein said instructions, when executed by the processor, perform one or more steps comprising determining said communication times, rates and packet sizes in the form of rate of packet arrival, size of packet to be sent, expected time of packet arrival, and end of a real-time application session.

3. The apparatus of claim 1, wherein said instructions, when executed by the processor, further perform one or more steps comprising determining if pre-packet arrival channel access is to be allowed based on amount of data to be sent and/or the period of channel access time.

4. The apparatus of claim 1, wherein said instructions, when executed by the processor, perform one or more steps comprising tracking of statistics to update expected pre-packet channel contention information by said WLAN station each time the communication channel is relinquished.

5. The apparatus of claim 1, wherein said instructions, when executed by the processor, perform one or more steps comprising:
running a counter or timer from a last packet arrival time to an estimated next arrival time for a new packet; and
starting a process of contending for a channel before the counter or timer expires in relation to a time offset from statistics collected on channel contention time or manually defined if the channel was busy at any time after the counter or timer reached a threshold.

6. The apparatus of claim 5, wherein the time offset is bounded by a specific amount not to be exceeded.

7. The apparatus of claim 1, wherein said instructions, when executed by the processor, perform one or more steps comprising:
obtaining access to the channel if it is not busy before the counter or timer expires by a time offset related to the collected statistics or manually defined;
wherein the offset is less than the offset of contention for the channel; and
occupying the channel by said WLAN station by sending non-RTA packets, null, dummy packets until the packet arrives from the real-time application.

8. An apparatus for wireless communication in a network, the apparatus comprising:
(a) a wireless communication circuit configured for wirelessly communicating with at least one other wireless local area network (WLAN) station in its reception area;
(b) a processor coupled to said wireless communication circuit within a station configured for operating on the WLAN; and
(c) a non-transitory memory storing instructions executable by the processor;
(d) wherein said instructions, when executed by the processor, perform one or more steps comprising:
(i) operating said wireless communication circuit as a WLAN station configured to support at least one real-time application that is sensitive to communication delays;
(ii) tracking active real-time application sessions and identifying running real time application (RTA) sessions with respect to communication times, rates and packet sizes in the form of rate of packet arrival, size of packet to be sent, expected time of packet arrival, and end of a real-time application session;
(iii) attempting to gain access to a communication channel before a packet arrives in a pre-packet arrival channel contention process based on information provided by an application layer of the at least one real-time application (RTA) on what time the packet will arrive to a MAC queue in a MAC layer of said WLAN station; and
(iv) tracking of statistics to update expected pre-packet channel contention information by said WLAN station each time the communication channel is relinquished;
(v) sending a request from a non-access point (non-AP) station to the access point (AP) in its basic service set (BSS) to perform said pre-packet arrival channel contention process in response to exchanging one or more messages or requests between said WLAN station and the AP; and
(vi) requesting a change of procedure parameters through exchanging parameter update messages with the access point (AP), in response to receiving acceptance of performing said pre-packet arrival channel contention process by the AP.

9. The apparatus of claim 8, wherein said instructions, when executed by the processor, further perform one or more steps comprising determining if pre-packet arrival channel access is to be allowed based on amount of data to be sent and/or the period of channel access time.

10. The apparatus of claim 8, wherein said instructions, when executed by the processor, perform one or more steps comprising:
running a counter or timer from a last packet arrival time to an estimated next arrival time for a new packet; and
starting a process of contending for a channel before the counter or timer expires in relation to a time offset from statistics collected on channel contention time or manually defined if the channel was busy at any time after the counter or timer reached a threshold.

11. The apparatus of claim 10, wherein the time offset is bounded by a specific amount not to be exceeded.

12. The apparatus of claim 8, wherein said instructions, when executed by the processor, perform one or more steps comprising:
obtaining access to the channel if it is not busy before the counter or timer expires by a time offset related to collected statistics or that is manually defined;
wherein the offset is less than the offset of contention for the channel; and
occupying the channel by said WLAN station by sending non-real time application (non-RTA) packets, null, or dummy packets until the packet arrives from the real-time application.

* * * * *